United States Patent [19]
Sugano et al.

[11] Patent Number: 5,623,022
[45] Date of Patent: Apr. 22, 1997

[54] PROCESS FOR PRODUCING PROPYLENE BLOCK COPOLYMERS

[75] Inventors: Toshihiko Sugano, Yokohama; Takao Tayano, Yokkaichi, both of Japan

[73] Assignee: Mitsubishi Chemical Corporation, Tokyo, Japan

[21] Appl. No.: 502,141

[22] Filed: Jul. 13, 1995

[30] Foreign Application Priority Data

Jul. 14, 1994 [JP] Japan .................. 6-162405

[51] Int. Cl.$^6$ ............................. C08F 297/08
[52] U.S. Cl. .............. 525/247; 525/240; 525/323; 526/160; 526/251
[58] Field of Search ................. 525/247, 323, 525/240; 526/351, 160

[56] References Cited

U.S. PATENT DOCUMENTS

| | | | |
|---|---|---|---|
| 5,081,322 | 1/1992 | Winter | 585/9 |
| 5,239,022 | 8/1993 | Winter | 526/127 |
| 5,280,074 | 1/1994 | Schreck | 525/240 |
| 5,322,902 | 6/1994 | Schreck | 525/247 |
| 5,391,629 | 2/1995 | Turner | 525/268 |
| 5,455,365 | 10/1995 | Winter | 556/67 |

*Primary Examiner*—Irina S. Zemel
*Attorney, Agent, or Firm*—Oblon, Spivak, McClelland, Maier & Neustadt, P.C.

[57] ABSTRACT

A propylene block copolymer having a high impact resistance is prepared without the generation of finely divided particles or the adhesion to the reactor, which propylene block copolymer having a weight ratio of 5/95–70/30 (process (1)/process (2)) is obtained by carrying out the particular polymerization processes (1) and (2) in this sequence under the action of the catalyst comprising the following A and B.

A: particular transition metal compound.

B: an alumoxane, the reaction product of an alkylboronic acid with an organoAl, a Lewis acid or ionic compound.

Process (1): process for copolymerizing propylene and a specified comonomer in a ratio of 0/100–80/20.

Process (2): process for producing a propylene polymer having a specified comonomer in an amount of 10% by weight or less.

16 Claims, No Drawings

PROCESS FOR PRODUCING PROPYLENE BLOCK COPOLYMERS

FIELD OF THE ART

The present invention relates to a process for producing propylene block copolymers. More specifically, the present invention relates to a process for producing propylene block copolymers having improved particle properties and mechanical properties.

BACKGROUND ART

Crystalline polypropylene, which is excellent in stiffness and heat resistance, has a drawback that it has a poor impact resistance, particularly one at a low temperature.

As the method for solving the drawback, a process for polymerizing stepwise propylene and ethylene or other olefins to form a block copolymer, that is the chemical blending method, is well known for example in Japanese Japanese Patent Publication Nos. 11230/1968, 16668/1969, 20621/1969, 24593/1974, 30264/1974, Japanese Patent Laid-Open Publication Nos. 25781/1973, 115296/1975, 35789/1978, 110072/1979, and the like. However, when propylene and ethylene are polymerized in two steps or in multi-steps in order to prepare a rubbery polymer which is to be used as a impact resistant ingredient in the resultant copolymer, the impact resistance is improved, but the product has the drawback that a large amount of polymers having a low crystallinity are produced as by-products due to the presence of copolymeric portions in the product It has generally been practiced to increase the production ratio of rubbery polymers for improving the impact strength of the block copolymers, but the increase in the amount of the rubbery polymer may often cause the increase of by-products, the adhesion of polymer particles to each other or the adhesion of the polymer particles to the internal wall of a polymer production unit, and thus result in the difficulty of stable continuous operation of the unit for a long period.

In the production of a conventional block copolymer comprising a block of a stereoregular polypropylene, a $TiC_{13}$ solid component or a solid component comprising magnesium, titanium and a halogen, but the block of propylene/ethylene copolymer obtained with the catalyst generally has a low uniformity of copolymerization and thus normally has a copolymerizability ratio $(r_P r_E)$ of 1.5 or more. Thus, even if the production ratio of the rubbery copolymer is increased during the copolymerization carried out with the very catalyst, the impact strength desired may be improved only insufficiently. Improvements have thus been proposed in that rubbery polymers having a excellent uniformity in copolymerization are separately prepared with an appropriate catalyst selected for the purpose and the rubbery polymers prepared are then blended with polypropylenes, as shown in Japanese Patent Laid-Open Publication Nos. 136735/1976, 222132/1983, 12742/1986 and 150343/1988.

The blending of such rubbery polymers having a good uniformity in polymerization may, however, entail problems that the rubbery copolymer is expensive and an operation is required for the blending.

Furthermore, the conventioal multi-step polymerization is ordinarily a two-step polymerization, and the rubbery polymer, which is described to be produced in either the former or latter step, is actually produced in the latter step in working examples of the proposed methods. It is quite reasonable to produce the rubbery polymer in the latter step, because in polymerization employing a titanium-containing solid catalyst component, the so-called Ziegler polymerization, if the rubbery polymer is produced in the former step, desired impact resistant polymers would not be in fact produced due to the facts that the rubbery polymer will prevent the catalyst from being uniformly distributed or that the rubbery polymer will not be dispersed uniformly in the final block copolymer.

Recently, it has been proposed to prepare a crystalline polypropylene in liquid propylene in the former step and to copolymerize propylene and ethylene or an α-olefin having 4–20 carbon atoms in the latter step for the purpose of improving the impact strength at a low temperature in EP 33989, EP 433990 and Japanese Patent Laid-Open Publication No. 114050/1992. It seems, however, difficult to produce a stable copolymer by these proposed methods, in that, while impact resistance at a low temperature may be improved, finely divided particulate polymers may tend to be produced, and when the amount of the polymer produced in the latter step is increased the agglomeration of particles or their adhesion to the wall of a reactor may tend to take place.

The object of the present invention is to produce a propylene block copolymer having an improved impact resistance without the problems in the conventional techniques such as the necessity of blending a rubbery copolymer having a good uniformity, the generation of finely divided particles, the agglomeration of particles or their adhesion to the wall of a reactor.

SUMMARY OF THE INVENTION

The present invention provides a process for preparing a propylene block copolymer having a satisfactory impact resistance without undue decrease in the high rigidity of polypropylene in two-steps, primarily characterized in that the use of a specific catalyst and the production in the former step of a rubbery polymer ingredient.

Thus, the process for preparing the propylene block copolymer according to the present invention comprises carrying out the following polymerization step (1) in the presence of a catalyst comprising the following components (A) and (B), and then carrying out the following polymerization step (2) in the presence of the catalyst described above and the polymer prepared according to the polymerization step (1) to form a block copolymer having a weight ratio of a polymer produced in the polymerization step (1) to a polymer produced in the polymerization step (2) in the range from 5/95 to 70/30:

Component (A) Which is a compound of a transition metal in the IVB–VIB groups of the Periodic Table which has a π-conjugated five-membered ring ligand.

Component (B) which is at least one compound selected from the compound group consisting of:

Ingredient (i) which is an alumoxane;

Ingredient (ii) which is a reaction product of the compound represented by the formula $R^4B—(OH)_2$ wherein $R^4$ represents a hydrocarbon group having 1–10 carbon atoms, with an organoaluminum compound;

Ingredient (iii) which is a Lewis acid; and

Ingredient (iv) which is an ionic compound,

Polymerization step (1) which is a step for polymerizing propylene with at least one comonomer selected from the group consisting of ethylene and an α-olefin having 4–20 carbon atoms so that the polymerization ratio in a molar ratio of propylene to the comonomer will be in the range from 0/100 to 80/20; and Polymerization step (2) which is a step for producing a crystalline propylene homopolymer or a propylene copolymer of propylene with at least one comonomer selected from the group consisting of ethylene and an α-olefin having 4–20 carbon atoms by polymerizing the monomer concerned, the copolymer having a comonomer content no higher than 10% by weight based on the polymer produced in the polymerization step (2).

According to the present invention, propylene block copolymers having an improved impact resistance can be obtained without problems such as the generation of finely divided particles, the agglomeration of particles or their adhesion to the wall of a reactor.

These effects according to the present invention is considered principally owing to carrying out the formation of a rubbery polymer in the former step of the two-step polymerization with a specific catalyst, i.e. the so-called "metallocene catalyst". Surprisingly, there occurs no problem which was observed in the Ziegler polymerization even if the rubbery polymer is produced in the former step, and in addition problems caused by the use of the metallocene catalyst were solved.

DETAILED DESCRIPTION OF PREFERRED EMBODIMENT OF THE INVENTION

[CATALYST]

The catalyst used for the production of the propylene block copolymer according to the present invention comprises components (A) and (B). The term "comprises" herein used has a meaning inherent therein and includes, the use, in addition of the Components (A) and (B), of any appropriate components or ingredients concomittant therewith to be used, insofar as the effects of the present invention will not be impaired.

<Component (A)>

The Component (A) is a compound of a transition metal of the IVB–VIB groups in the Periodic Table which has at least a π-conjugated five-membered ring ligand. Such transition metal compound itself and its use as a catalyst ingredient or component of the olefin polymerization have already been known, and any appropriate compounds can be used in the present invention.

The compounds preferred as the Component (A) is a transition metal compound represented by the formula [I] or [II]:

  [I]

  [II]

wherein Q represents a bonding group which crosslinks the two conjugated five-membered ring ligands, S represents a bonding group which crosslinks the conjugated five-membered ring ligand and the group Z, Me represents a transition metal of the IVB–VIB groups in the Periodic Table, X and Y, respectively, represent independently hydrogen, a halogen group, a hydrocarbon group having 1–20 carbon atoms, an alkoxy group and alkylamido group having 1–20 carbon atoms, a phosphorus-containing hydrocarbon group having 1–20 carbon atoms, or a silicon-containing hydrocarbon group having 1–20 carbon atoms, Z represents oxygen, sulfur, an alkoxy group having 1–20 carbon atoms, a thioalkoxy group having 1–20 carbon atoms, a silicon-containing hydrocarbon group having 1–40 carbon atoms, a nitrogen-containing hydrocarbon group having 1–40 carbon atoms, or a phosphorus-containing hydrocarbon group having 1–40 carbon atoms; $R^1$, $R^2$ and $R^3$, respectively, represent independently a hydrocarbon group having 1–20 carbon atoms, a halogen atom, an alkoxy group, a silicon-containing hydrocarbon group, phosphorus-containing hydrocarbon group, a nitrogen-containing hydrocarbon group or a boron-containing hydrocarbon group; two adjacent $R^1$, two adjacent $R^2$, or two adjacent $R^3$ may or may not be bonded to each other to form a ring, respectively; a, b and c denote an integer which satisfies $0 \leq a \leq 4$, $0 \leq b \leq 4$, and $0 \leq c \leq 4$, respectively.

Specific examples of the bonding group Q which crosslinks the two conjugated five-membered ring ligands and the bonding group S which crosslinks a conjugated five-membered ring ligand and the group Z include:

(a) a lower alkylene group which is linear or is branched in that it has a lower alkyl (preferably up to about $C_4$) or phenyl branch on it, or cycloalkylene group, preferably a methylene group, an ethylene group, an isopropylene group, i.e. a dimethylmethylene group, a phenylmethylmethylene group, a diphenylmethylene group or a cyclohexylene group, (b) a silylene or oligosilylene group or its lower alkyl preferably up to about $C_4$) or phenyl substituted derivative, preferably a silylene group, a dimethylsilylene group, a phenylmethylsilylene group, diphenylsilylene group, a disilylene group, a tetramethyldisilylene group, and the like, (c) a germanium-, phosphorus-, nitrogen-, boron- or aluminum-containing hydrocarbon group, specifically those groups such as $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$ or $(CH_3O)Al$, preferably an alkylene group and a silylene group. When the group Q or S is of chain, the distance between the two linkings of the divalent groups Q or S is preferably of about four atoms or less, particularly three atoms or less; when Q or S contains a cyclic group, the distance is preferably in the range of the cyclic group plus about two atoms or less, particularly of only the cyclic group. Thus, ethylene and isopropylidene having the distance of linkings of two atoms and one atom, respectively, are preferred in the case of an alkylene, cyclohexylene having the distance of linkings of only the cyclohexylene group is preferred in the case of a cycloalkylene group, and dimethylsilylene having the distance of linkings of one atom is preferred in the case of alkylsilylene, respectively.

In the formulae described above, while the conjugated five-membered ring ligands $(C_5H_{4-a}R^1_a)$, $(C_5H_{4-b}R^2_b)$ and $(C_5H_{4-c}R^2_c)$ are defined separately, a, b and c have the same meanings, and $R^1$, $R^2$ and $R^3$ as well, details being described hereafter, so that it is a matter of course that these three conjugated five-membered ring groups may be the same or different.

A specific example of the conjugated five-membered ring group is a cyclopentadienyl group wherein a=0 (alternatively b=0 or c=0), having no substituents except the crosslinking group Q or S. When the conjugated five-membered ring group has a substituent wherein a≠0 (alternatively b≠0 or c≠0), a specific example of $R^1$ (alternatively $R^2$ or $R^3$) is a hydrocarbon group ($C_1$–$C_{20}$, preferably $C_1$–$C_{12}$), which may be bonded to the cyclopentadienyl group as a monovalent group, or when a plurality of the groups are present, two of the groups may or may not be bonded at their ω-terminals to form a ring together with the part of the cyclopentadienyl group to which the two groups are bonded. Typical example of the latter is the one wherein $R^1$ (alternatively $R^2$ or $R^3$) forms a fused six-membered ring having in common the double bond of the cyclopentadienyl group, that is to say the one wherein the conjugated five-membered ring group is an indenyl or fluorenyl group. In other words, typical examples of the conjugated five-membered ring group are substituted or unsubstituted cyclopentadienyl, indenyl and fluorenyl groups.

$R^1$, $R^2$ and $R^3$, respectively, include, in addition to the above described $C_1$–$C_{20}$, preferably $C_1$–$C_{12}$ hydrocarbon group, a halogen atom such as fluorine, chlorine or bromine, an alkoxy group such as the one having 1–12 carbon atoms, a silicon-containing hydrocarbon group such as a group containing a silicon atom in the form of —Si(R)(R')(R'') and having 1–ca. 24 carbon atoms, a phosphorus-containing hydrocarbon group such as a group containing a phosphorus atom in the form of —P(R)(R') and having 1–ca. 18 carbon atoms, a nitrogen-containing hydrocarbon group such as a group containing a nitrogen atom in the form of —N(R)(R') and having 1–ca. 18 carbon atoms, or a boron-containing hydrocarbon group such as a group containing a boron atom in the form of —B(R)(R') and having 1–ca. 18 carbon atoms. When a (alternatively b or c) denotes 2 or more and a plurality of $R^1$ (alternatively $R^2$ or $R^3$) are present, these substituents may be the same or different.

a, b and c denote an integer which satisfies $0 \leq a \leq 4$, $0 \leq b \leq 4$, and $0 \leq c \leq 4$, respectively.

Me is a transition metal in the IVB–VIB groups of the Periodic Table, preferably titanium, zirconium and hafnium, more preferably titanium and zirconium.

Z represents (a) oxygen (—O—), sulfur (—S—); (b) an alkoxy group having 1–20, preferably 1–10 carbon atoms; (c) a thioalkoxy group having 1–20, preferably 1–12 carbon atoms; (d) a silicon-containing hydrocarbon group having 1–40, preferably 1–18 carbon atoms; (e) a nitrogen-containing hydrocarbon group having 1–40, preferably 1–18 carbon atoms; or a phosphorus-containing hydrocarbon group having 1–40, preferably 1–18 carbon atoms, and a portion of the group Z is bonded to the S group as a bonding group.

X and Y, which may be the same or different, respectively represent hydrogen, a halogen group, a hydrocarbon group having 1–20, preferably 1–10 carbon atoms, an alkoxy or alkylamido group having 1–20, preferably 1–10 carbon atoms, a phosphorus-containing hydrocarbon group having 1–20, preferably 1–12 carbon atoms, specifically, for example, a diphenyl phosphine group, or a silicon-containing hydrocarbon group having 1–20, preferably 1–12 carbon atoms, specifically, for example, a trimethylsilyl group or a bis(trimethylsilyl) group, among which a halogen group, a hydrocarbon group and an alkylamido group are preferred.

Specific examples of the transition metal compound wherein Me represents zirconium are illustrated below.

(a) Transition metal compounds having two five-membered ring ligands crosslinked with an alkylene group, such as:
(1) methylenebis(indenyl)zirconium dichloride,
(2) ethylenebis(indenyl)zirconium dichloride,
(3) ethylenebis(indenyl)zirconium monohydride monochloride,
(4) ethylenebis(indenyl)methylzirconium monochloride,
(5) ethylenebis(indenyl)zirconium monomethoxide monochloride,
(6) ethylenebis(indenyl)zirconium diethoxide,
(7) ethylenebis(indenyl)zirconium dimethyl,
(8) ethylenebis(4,5,6,7-tetrahydroindenyl)zirconium dichloride,
(9) ethylenebis(2-methylindenyl)zirconium dichloride,
(10) ethylenebis(2-ethylindenyl)zirconium dichloride,
(11) ethylenebis(2,4-dimethylindenyl)zirconium dichloride,
(12) ethylenebis(2-methyl-4-phenylindenyl)zirconium dichloride,
(13) ethylenebis(2-methyl-4,5-benzindenyl)zirconium dichloride,
(14) ethylenebis(2,4-dimethylcyclopentadienyl)(3',5'-dimethylcyclopentadienyl)zirconium dichloride,
(15) ethylene(2-methyl-4-tert-butylcyclopentadienyl) (3'-tert-butyl-5'-methylcyclopenta-dienyl)zirconium dichloride,
(16) ethylene(2,3,5-trimethylcyclopentadienyl)(2',4',5'-trimethylcyclopentadienyl)zirconium dichloride,
(17) isopropylidenebis(indenyl)zirconium dichloride,
(18) isopropylidene(2,4-dimethylcyclopentadienyl)(3',5'-dimethylcyclopentadienyl) zirconium dichloride,
(19) isopropylidene(2-methyl-4-tert-butylcyclopentadienyl)(3'-tert-butyl-5'-methylcyclopentadienyl)zirconium dichloride,
(20) methylene(cyclopentadienyl)(3,4-dimethylcyclopentadienyl)zirconium dichloride,
(21) methylene(cyclopentadienyl)(3,4-dimethylcyclopentadienyl)zirconium chloride hydride,
(22) methylene(cyclopentadienyl)(3,4-dimethylcyclopentadienyl)zirconium dimethyl,
(23) methylene(cyclopentadienyl)(3,4-dimethylcyclopentadienyl)zirconium diphenyl,
(24) methylene(cyclopentadienyl) (trimethylcyclopentadienyl)zirconium dichloride,
(25) methylene(cyclopentadienyl) (tetramethylcyclopentadienyl)zirconium dichloride,
(26) isopropylidene(cyclopentadienyl)(3,4-dimethylcyclopentadienyl)zirconium dichloride,
(27) isopropylidene(cyclopentadienyl)(2,3,4,5-tetramethylcyclopentadienyl)zirconium dichloride,
(28) isopropylidene(cyclopentadienyl)(3-methylindenyl)zirconium dichloride,
(29) isopropylidene(cyclopentadienyl) fluorenyl)zirconium dichloride,
(30) isopropylidene(2-methylcyclopentadienyl) fluorenyl)zirconium dichloride,
(31) isopropylidene(3-tert-butylcyclopentadienyl) fluorenyl)zirconium dichloride,
(32) isopropylidene(2,5-dimethylcyclopentadienyl) 3',4'-dimethylcyclopentadienyl)zirconium dichloride,
(33) isopropylidene(2,5-dimethylcyclopentadienyl) fluorenyl ) zirconium dichloride,
(34) ethylene(cyclopentadienyl)(3,5 -dimethylcyclopentadienyl) zirconium dichloride,
(35) ethylene(cyclopentadienyl)(fluorenyl)zirconium dichloride,
(36) ethylene(2,5-dimethylcyclopentadienyl) (fluorenyl)zirconium dichloride,
(37) ethylene(2, 5-diethylcyclopentadienyl) (fluorenyl) zirconium dichloride,

(38) diphenylmethylene(cyclopentadienyl)(3,4-diethylcyclopentadienyl) zirconium dichloride,

(39) diphenylmethylene(cyclopentadienyl)(3,4-diethylcyclopentadienyl) zirconium dichloride,

(40) cyclohexylidene(cyclopentadienyl) (fluorenyl)zirconium dichloride,

(41) cyclohexylidene(2,5-dimethylcyclopentadienyl) (3', 4'-dimethylcyclopentadienyl) zirconium dichloride;

(b) Transition metal compounds having five-membered ring ligands crosslinked with an silylene group, such as:

(1) dimethylsilylenebis(indenyl)zirconium dichloride, (2) dimethylsilylenebis(4,5,6,7-tetrahydroindenyl) zirconium dichloride, (3) dimethylsilylenebis(2-methylindenyl)zirconium dichloride, (4) dimethylsilylenebis(2,4-dimethylindenyl) dichloride, (5) dimethylsilylenebis(2-methyl-4,5,6,7-tetrahydroindenyl)zirconium dichloride, (6) dimethylsilylene(2,4-dimethylcyclopentadienyl) (3', 5'-dimethylcyclopentadienyl)zirconium dichloride, (7) dimethylsilylenebis(2-methyl-4,4-dimethyl-4,5,6,7-tetrahydroindenyl)zirconium dichloride, (8) dimethylsilylenebis(2-methyl-4,4-dimethyl-sila-4,5,6,7-tetrahydroindenyl)zirconium dichloride, (9) dimethylsilylenebis(2-methyl-4,5-benzindenyl)zirconium dichloride,

(10) dimethylsilylenebis(2-methyl-4-phenylindenyl)zirconium dichloride,

(11) phenylmethylsilylenebis(indenyl)zirconium dichloride,

(12) phenylmethylsilylenebis(2-methylindenyl)zirconium dichloride,

(13) phenylmethylsilylenebis(2,4-dimethylindenyl)zirconium dichloride,

(14) phenylmethylsilylenebis(4,5,6,7-tetrahydroindenyl)zirconium dichloride,

(15) phenylmethylsilylene(2,4-dimethylcyclopentadienyl) (3',5'-dimethylcyclopentadienyl)zirconium dichloride,

(16) phenylmethylsilylenebis(2,3,5-trimethylcyclopentadienyl)(2',4',5'-trimethylcyclopentadienyl)zirconium dichloride,

(17) phenylmethylsilylenebis-(tetramethylcyclopentadienyl)zirconium dichloride,

(18) diphenylsilylenebis(indenyl)zirconium dichloride,

(19) tetramethyldisilylenebis(indenyl)zirconium dichloride,

(20) tetramethyldisilylenebis(cyclopentadienyl)zirconium dichloride,

(21) tetramethyldisilylene(3-methylcyclopentadienyl) (indenyl)zirconium dichloride, (22) dimethylsilylene(cyclopentadienyl)(3,4-dimethylcyclopentadienyl)zirconium dichloride,

(23) dimethylsilylene(cyclopentadienyl) (trimethylcyclopentadienyl)zirconium dichloride,

(24) dimethylsilylene(cyclopentadienyl) (tetramethylcyclopentadienyl)zirconium dichloride,

(25) dimethylsilylene(cyclopentadienyl)(3,4-diethylcyclopentadienyl)zirconium dichloride,

(26) dimethylsilylene(cyclopentadienyl) (triethylcyclopentadienyl)zirconium dichloride,

(27) dimethylsilylene(cyclopentadienyl) (tetraethylcyclopentadienyl)zirconium dichloride,

(28) dimethylsilylene(cyclopentadienyl) (fluorenyl)zirconium dichloride,

(29) dimethylsilylene(cyclopentadienyl)(2,7-di-t-butylfluorenyl)zirconium dichloride,

(30) dimethylsilylene(cyclopentadienyl) (octahydrofluorenyl)zirconium dichloride,

(31) dimethylsilylene(2-methylcyclopentadienyl) (fluorenyl)zirconium dichloride,

(32) dimethylsilylene(2,5-dimethylcyclopentadienyl) (fluorenyl)zirconium dichloride,

(33) dimethylsilylene(2-ethylcyclopentadienyl) (fluorenyl)zirconium dichloride,

(34) dimethylsilylene(2,5-diethylcyclopentadienyl) (fluorenyl)zirconium dichloride,

(35) diethylsilylene(2-methylcyclopentadienyl)(2',7'-di-t-butylfluorenyl) zirconium dichloride,

(36) dimethylsilylene (2,5-dimethylcyclopentadienyl) (2', 7'-di-t-butylfluorenyl)zirconium dichloride,

(37) dimethylsilylene(2-ethylcyclopentadienyl)(2',7'-di-t-butylfluorenyl) zirconium dichloride,

(38) dimethylsilylene(diethylcyclopentadienyl)(2',7'-di-t-butylfluorenyl) zirconium dichloride,

(39) dimethylsilylene(methylcyclopentadienyl) (octahydrofluorenyl)zirconium dichloride,

(40) dimethylsilylene(dimethylcyclopentadienyl) (octahydrofluorenyl)zirconium dichloride,

(41) dimethylsilylene(ethylcyclopentadienyl) (octahydrofluorenyl)zirconium dichloride,

(42) dimethylsilylene(diethylcyclopentadienyl) (octahydrofluorenyl)zirconium dichloride (c) Transition metal compounds having five-membered ring ligands crosslinked with a germanium-, aluminum-, boron-phophorus- or, nitrogen-containing hydrocarbon group, such as:

(1) dimethylgermaniumbis(indenyl)zirconium dichloride, (2) dimethylgermanium(cyclopentadienyl) (fluorenyl)zirconium dichloride, (3) methylaluminumbis(indenyl)zirconium dichloride, (4) phenylaluminumbis(indenyl)zirconium dichloride, (5) phenylphosphinobis(indenyl)zirconium dichloride, (6) ethylboranobis(indenyl)zirconium dichloride, (7) phenylaminobis(indenyl)zirconium dichloride, (8) phenylamino(cyclopentadienyl)(fluorenyl)zirconium dichloride.

(d) Transition metal compounds having one five-membered ring ligand, such as:

(1) pentamethylcyclopentadienyl-bis(phenyl)-amidozirconium dichloride, (2) indenyl-bis(phenyl)amidozirconium dichloride, (3) pentamethylcyclopentadienyl-bis(trimethylsilyl)amidozirconium dichloride, (4) pentamethylcyclopentadienylphenoxyzirconium dichloride, (5) dimethylsilylene(tetramethylcyclopentadienyl)-phenylamidozirconium dichloride, (6) dimethylsilylene(tetramethylcyclopentadienyl)-tert-butylamidozirconium dichloride, (7) dimethylsilylene(indenyl)cyclohexylamidozirconium dichloride, (8) dimethylsilylene(tetrahydroindenyl) decylaminozirconium dichloride, (9) dimethylsilylene(tetrahydroindenyl) {(trimethylsilyl)amino}zirconium dichloride,

(10) dimethylgerman(tetramethylcyclopentadienyl) (phenyl)aminozirconium dichloride.

(e) The compounds (a)–(d) described above of which the chlorine has been replaced by bromine, iodine, hydride, methyl or phenyl.

Furthermore, it is also possible to use, as the Component (A), the compounds (a)–(e) described above of which the zirconium as the central metal has been replaced by titanium, hafnium, niobium, molybdenum or tungsten.

Among these compounds, preferred ones are the zirconium compounds, the hafnium compounds and the titanium compounds. More preferred ones are the titanium, zirconium and hafnium compounds which have been crosslinked with an alkylene group or a silylene group.

The preferred compounds as the Component (A) in the present invention are those which will produce propylene block copolymers, through the steps (1) and (2) in which the Component (A) is used, which have an [mm] of the xylene insolubles at 23° C. in the range of 0.85 or more, preferably 0.90 or more, for the isotactic polypropylene content therein, and are those having the following substituents, particularly the compounds of the formula [I]:

Q, S: —CH$_2$—, —C(CH$_3$)$_2$—, —C(C$_6$H$_5$)$_2$—, —CH$_2$CH$_2$—,

—CH(C$_6$H$_5$)—CH(C$_6$H$_5$)—, —Si(CH$_3$)$_2$—,

—Si(CH$_3$)(C$_6$H$_5$)—, or—Si(C$_6$H$_5$)$_2$—,

R$^1$, R$^2$, R$^3$: —CH$_3$, —C$_2$H$_5$, -isoPr, -t-Bu, -iso-Bu, -n-Bu, —Si(CH$_3$)$_3$, —CH=CH—CH=CH—,
—CH=C(CH$_3$)—CH=CH—, —CH=C(C$_6$H$_5$)—CH=CH—, —CH$_2$—CH$_2$—CH$_2$—CH$_2$—,
—CH$_2$CH$_2$—CH$_2$—CH$_2$CH$_2$—, —C(CH$_3$)$_2$—CH=CH—CH=CH—,
—C(CH$_3$)$_2$—CH$_2$—CH$_2$—CH$_2$—CH$_2$—,
—C(CH$_3$)$_2$—CH$_2$—CH$_2$—CH$_2$—, or—Si(CH$_3$)$_2$—CH$_2$—CH$_2$—CH$_2$—, a: 0, 1, 2, 3 or 4, b: 0, 1, 2, 3 or 4, c: 0, 1, 2, 3 or 4, Me: Ti, Zr or Hf, X: —H, —Cl, —Br, —F, —CH$_3$, —CH$_2$(C$_6$H$_5$), —(C$_6$H$_5$), —N(CH$_3$)$_2$, —N(C$_2$H$_5$)$_2$, or—OSO$_3$CF$_3$; and Z: >N-t-Bu, >N—(C$_6$H$_5$), >N—C$_6$H$_{11}$, >N—C$_8$H$_{15}$, or>N—C$_{12}$H$_{23}$.

<Component (B)>

The Component (B) comprises at least one compound selected from the group consisting of the ingredients (i)–(iv) which will be given hereinbelow. Thus, the Component (B) of the present invention may include in addition to the single species selected from one of these ingredients (i)–(iv), two or more compounds selected from one of the ingredients (i)–(iv) and/or two or more of these ingredients (i)–(iv).

Ingredient (i)

The ingredient (i) is an alkylalumoxane, which may alternatively called an "aluminoxane". An alumoxane is a product obtained by the reaction of a trialkylaluminum or two or more trialkylaluminums with water. The alkyl group is a single species or two or more in combination preferably having 1–6, more preferably 1–4 carbon atoms in the alkyl. Specific examples include methylalumoxane, ethylalumoxane, butylalumoxane and isobutylalumoxane obtained from a single trialkylaluminum, and methylethylalumoxane, methylbutylalumoxane, and methylisobutylalumoxane obtained from ttriatrialkylaluminums, and water.

In the present invention, it is possible to use two or more of these alumoxanes, and it is also possible to use the alumoxane in combination with the other alkylaluminums such as trimethylaluminum, triethylaluminum, triisobutylaluminum, dimethylaluminum chloride and the like.

It is also possible to use a modified alumoxane obtained by reacting two alumoxanes or an alumoxane with another organoaluminum compound.

Among these, methylalumoxane, isobutylalumoxane, methylisobutylalumoxaneand mixtures thereof with a trialkylaluminum are preferred, and methylalumoxane and methylisobutylalumoxane are more preferred.

In the polymerization of propylene, methylisobutylalumoxane having a chemical shift in the range of 160–250 ppm and a peak width of 3,000 Hz or more in the measurement of $^{27}$Al-NMR are preferred.

These alumoxanes can be prepared under a variety of well-known conditions. Specific examples of the methods include:

(a) a method where a trialkylaluminum is reacted directly with water in the presence of an appropriate organic solvents such as toluene, benzene or ether, (b) a method where a trialkylaluminum is reacted with a salt hydrate containing water of crystallization such as a hydrate of copper sulfate or aluminum sulfate, (c) a method where a trialkylaluminum is reacted with water in silica gel or the like which has been impregnated with water, (d) a method where an alkylaluminum such as trimethylaluminum and another alkylaluminum such as triisobutylaluminum are admixed and the admixture reacted directly with water in the presence of an appropriate organic solvent such as toluene, benzene or ether, (e) a method where a trialkylaluminum such as trimethylaluminum and another trialkylaluminum such as triisobutylaluminum are admixed and the admixture are reacted with a salt hydrate containing water of crystallization such as a hydrate of copper sulfate or aluminum sulfate under heating, (f) a method where silica gel is impregnated with water, the silica gel is treated with a trialkylaluminum such as triisobutylaluminum, and then with another trialkylaluminum such as trimethylaluminum, and (g) a method where an alkylalumoxane such as methylalumoxane and another alkylalumoxane such as isobutylalumoxane are separately prepared by a known method, and the two alumoxanes are admixed in a specified proportion, followed by heating to react.

Ingredient (ii)

The ingredient (ii) is a reaction product of the following ingredients (a) and (b).

The ingredient (a) is an alkylboronic acid represented by the formula:

$$R^4B\!-\!(OH)_2$$

wherein R$^4$ represents a hydrocarbon group having 1–10, preferably 1–6 carbon atoms. Specific examples of the ingredient (a) include methylboronic acid, ethylboronic acid, isopropylborinic acid, n-propylboronic acid, n-butylboronic acid, iso-butylboronic acid, n-hexylboronic acid, cyclohexylboronic acid, phenylboronic acid, 3,5-difluorophenylboronic acid, pentafluorophenylboronic acid, 3,5-bis(trifluoromethyl)phenylboronic acid, and the like. Among these boronic acids are preferred methylboronic acid, ethylboronic acid, n-butylboronic acid, iso-butylboronic acid, 3,5-difluorophenylboronic acid, and pentafluorophenylboronic acid. More preferred are methylboronic acid, ethylboronic acid and butylboronic acid.

The ingredient (b) to be reacted with the ingredient (a) for the formation of the ingredient (ii) is an organoaluminum compound.

Specific examples of the ingredient (b) preferably include the compounds represented by the formula $$R_{3-q}^5 AlX_q, \quad R_{3-q}^5 Al-[OSi-(R^6)_3]_q, \text{ or}$$
$$(R^5)_2-Al-O-Al-(R^5)_2$$

wherein $R^5$ represents a hydrocarbon group having 1–10, preferably 1–6 carbon atoms, X represents hydrogen or a halogen, $R^6$ represents hydrogen, a halogen, or a hydrocarbon group having 1–10, preferably 1–6 carbon atoms, q denotes $0 \leq q < 3$.

Specific examples of the ingredient (b) include (i) trialkylaluminums such as trimethylaluminum, triethylaluminum, triisopropylaluminum, triisobutylaluminum, tri-n-butylaluminum, trihexylaluminum, trioctylaluminum, tridecylaluminum, tri-n-propylaluminum and triisoprenylaluminum; (ii) alkylaluminum halides such as dimethylaluminum chloride, diethylaluminum monochloride, diisobutylaluminum monochloride, methylaluminum sesquichloride, ethylaluminum sesquichloride, ethylaluminum dichloride and diethylaluminum fluoride; (iii) alkylaluminum hydrides such as dimethylaluminum hydride, diethylaluminum hydride and diisopropylaluminum hydride; (iv) an alkylaluminum siloxides such as dimethylaluminum (trimethylsiloxide), dimethylaluminum (trimethylsiloxide) and diethylaluminum (trimethylsiloxide); (v) tetraalkylalumoxanes such as tetraisobutylalumoxane and tetraethylalumoxane. It is also possible to use two or more of the compounds selected from one of the groups (i)–(v) and/or from two or more of these groups (i)–(v).

Ingredient (iii)

The ingredient (iii) is a Lewis acid. Prefered is a Lewis acid which is capable of reacting with the Component (A) to convert it into a cation.

As a Lewis acid, particularly the one which can convert the Component (A) into a cation, there are illustrated a variety of organoboron compounds and metal halide compounds. Specifically, there can be mentioned (a) an organoboron compound such as triphenylboron, tris(3,5-difluorophenyl)boron and tris(pentafluorophenyl)boron; (b) a metal halide compound containing aluminum or magnesium such as aluminum chloride, aluminum bromide, aluminum iodide, magnesium chloride, magnesium bromide, magnesium iodide, magnesium chlorobromide, magnesium chloroiodide, magnesium bromoiodide, magenesium chloride hydride, magnesium chloride hydroxide, magnesium bromide hydroxide, magnesium chloride alkoxide and magnesium bromide alkoxide.

Among these compounds are preferably an organoboron compound, more preferably tris(pentafluorophenyl)boron.

Some of the Lewis acids can be also considered to be the ingredient (iv), which will be described in detail hereafter, as "an ionic compound which can react with the Component (A) to convert it into a cation." Thus, it should be understood that a compound belonging to both of "the Lewis acid" and "the ionic compound which can react with the Component (A) to convert it into a cation" classified into either one of the two classes.

Ingredient (iv)

The ingredient (iv) is an ionic compound, preferably an ionic compound which can react with the Component (A) to convert it into a cation. This compound herein is preferably represented by the formula [III]:

$$[K]^{e+}[A]^{e-} \quad \text{[III]}$$

wherein K represents an ionic cation moiety such as a carbonium cation, a tropylium cation, an ammonium cation, an oxonium cation, a sulfonium cation and a phophonium cation. A cation of a mtal which itself is liable to be rduced and a cation of an organometal are other examples. Specific examples of these cations include (a) triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tri(dimethylphenyl)phosphonium, tri(methylphenyl)phosphonium, triphenylphosphonium, triphenyloxonium, triethyloxonium, pyrilium, as well as a silver ion, a gold ion, a platinum ion, a copper ion, a palladium ion, a mercury ion, a ferrocenium ion, and the like.

The moiety A in the above described formula [III] is an anionic moiety having an ionic valence e, which will be a counter anion (generally non-coordinated) against a cationic species derived from the Component (A), and includes for example an organoboron compound anion, an organoaluminum compound anion, an organogallium compound anion, a phophorus compound anion, an arsenic compound anion, an antimony compound anion, and the like. Specific examples include (a) tetraphenylboron, tetrakis(3,4,5-trifluorophenyl)boron, tetrakis(3,5-di(trifluoromethyl)phenyl)boron, tetrakis(3,5-di(t-butyl)phenyl)boron, tetrakis(pentafluorophenyl)boron, (b) tetraphenylaluminum, tetrakis(3,4,5-trifluorophenyl)aluminum, tetrakis(3,5-di(trifluoromethyl)phenyl)aluminum, tetrakis(3,5-di(t-butyl)phenyl)aluminum, tetrakis(pentafluorophenyl)aluminum, (c) tetraphenylgallium, tetrakis(3,4,5-trifluorophenyl)gallium, tetrakis(3,5di(trifluoromethyl)phenyl)gallium, tetrakis(3,5-di(t-butyl)phenyl)gallium, tetrakis(pentafluorophenyl)gallium, (d) hexafluorophosphorus, (e) hexafluoroarsenic, (f) hexafluoroantimony, (g) a decaborate, an undecaborate, a carbadodecaborate and a decachlorodecaborate. An organoboron compound anion is preferable and a tetrakis(pentafluorophenyl)boron anion is more preferable.

<Component (C)>

As described above, the catalyst used in the present invention can comprise, in addition to the Components (A) and (B), appropriate components or ingredients. Typical examples of such components or ingredients include finely divided particulate support or carrier material, Component (C), and an organoaluminum compound which will be described in detail hereafter, and the catalyst comprising such additional components or ingredients also comprises a preferred aspect of the present invention.

The finely divided particulate carrier, the Component (C), may be either organic or inorganic. Specific examples as the organic compound carrier include (a) an α-olefin polymer such as polyethylene, polypropylene, polybutene-1, an ethylene-propylene copolymer, an ethylene-butene-1 copolymer, an ethylene-hexene-1 copolymer, a propylene-butene-1 copolymer, a propylene-hexene-1 copolymer, a propylene-divinylbenzene copolymer, (b) an aromatic unsaturated hydrocarbon polymer such as polystyrene, a styrene-divinylbenzene copolymer, and (c) a polar group—containing polymer such as a polyacrylate, a polymethacrylate, polyacrylonitrile, polyvinyl chloride, polyamide, polyphenylene ether, polyethylene terephthalate and polycarbonate. Specific examples of the inorganic carrier include (a) inorganic oxides such as $SiO_2$, $Al_2O_3$, $MgO$, $ZrO_2$, $TiO_2$, $B_2O_3$, $CaO$, $ZnO$, $BaO$, $ThO_2$, $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$, (b) inorganic halides such as $MgCl_2$, $AlCl_3$ and $MnCl_2$, (c) inorganic carbonates, sulfates or nitrates such as $Na_2CO_3$, $K_2CO_3$, $CaCO_3$, $MgCO_3$, $Al_2(SO_4)_3$, $BaSO_4$, $KNO_3$, $Mg(NO_3)_2$, (d) inorganic hydroxides such as $Mg(OH)_2$, $Al(OH)_3$ and $Ca(OH)_2$.

These carriers having a volume of 0.006–10 μm pores generally in the range of 0.1 cc/g or more, preferably 0.3 cc/g or more, more preferably 0.8 cc/g or more are used. Particularly, the carrier having the sum of the volume of 0.05–2 μm pores to be 50% or more of the total volume of the whole pores in the range of 0.006–10 μm is effective in the present invention.

The particle diameter of the support or carrier is optional, which is generally in the range of 1–3,000 μm, preferably 5–2,000 μm, more preferably 10 μm–1,000 μm.

Among these carriers, preferred is a carrier of an organic compound having a total volume of 0.006–10 μm pores in the range of 0.1 cc/g or more and the sum of the volumes of 0.05–2 μm pores to be 50% or more of the total volume of the whole pores in the range of 0.006–10 μm, more preferable being an α-olefin polymer of these porosity characteristics.

<Other Optional Components>

Optional components which can be used in combination with the above described Components (A) and (B) or Components (A), (B) and (C) include for example organoaluminum compounds. The organoaluminum compounds speicifically include a tri-lower alkylaluminum, a di-lower alkylaluminum monohalide, a mono-lower alkylaluminum dihalide and a lower alkylaluminum sesquihalide as well as a derivative thereof in which a part of these alkyl groups has been replaced by a phenoxy group such as trimethylaluminum, triethylaluminum, triisobutylaluminum, diethylaluminum phenoxide and dimethylaluminum chloride.

[MAKING UP OF CATALYSTS]

The catalyst according to the present invention can be prepared by a variety of methods. When the catalyst comprises the Components (A) and (B), these components may be placed into contact by any means capable of ensuring satisfactory contact of these components.

In the case of the catalyst comprising the Components (A), (B) and (C), it may be a preferable method for putting the Components (A) and (B) supported on the Component (C) to impregnate the Component (C) with the Components (A) and (B) solubilized in an inert solvent. As the inert solvent in such cases, benzene, toluene, xylene, hexane, heptane, octane, decalin, dichloromethane, dichloroethane, chloropropane and chlorobenzene are used. The solvent used does not have to be removed after the impregnation. The amount of the solvent remained in the impregnated mass may be at any level and may depend on the pore volume of the finely divided carrier, viz. Component (C) used. It ranges generally in 0–70% by weight, preferably 5–50% by weight based on the impregnated Component (C).

If the amount exceeds 70% by weight, the Component (C) would not maintain a particulate state, resulting in agglomeration or a sludge, which may undesirably disturb the stable progress of the subsequent polymerization, or contains imsupported catalyst components, which would produce a ultrafine catalyst as such or after having undergone the subsequent preliminary polymerization which will be described in detail later. In this connection, the residual amount of the inert solvent may affect the activity of the catalyst on the vapor phase preliminary polymerization, so that the vapor phase preliminary polymerization is more readily controlled in the residual amount of the inert solvent in the range of 5% by weight or more.

The above described impregnation operation is generally carried out under the inert atmosphere at a temperature in the range of from –78° C. to 100° C., preferably from –78° C. to 50° C. Periods required for the impregnation operation is optional and generally within 24 hours, preferably within 10 hours.

The amounts of the Components (A), (B) and (C) used can be at any levels as long as the advantages inherent in the present invention are obtainable. The amount of the Component (B) may generally range from 0.1 g to 10 g preferably from 0.3 g to 5 g of the Component (B) to 1 g of the Component (C). If the amount used is less than 0.1 g, the satisfactory activity per solid catalyst would not be obtained. When the amount exceeds 10 g, the Component (B) may remain unsupported on the Component (C) as independent particles, which is undesirably combined with the Component (A) to develop activity for producing a finely divided particulate polymer.

The amount of the Component (A) used, which may also be at any level, may generally be such that the molar ratio to the Component (B), when the Component (B) is the ingredient (i), of 1–10,000, preferably 10–3,000, more preferably 30–1,000 per aluminum atom of the Component (B). If the Component (B) is a Lewis acid or an ionic compound, the ratio of the Component (B)/the Component (A) is in the range of 0.1–1,000, preferably 0.5–100, more preferably 1–10.

The solid product comprising the Components (A) and (B) supported on the Component (C) obtained above can be used as a catalyst as such, or after having undergone preliminary polymerization which comprises contacting the catalyst with an olefin preferably under the gas phase condition thereby to polymerize the olefin in a smaller amount. If the catalyst is to be subjected to the preliminary polymerization, ethylene, propylene, butene-1, 3-methylbutene-1, and a mixture thereof are employed as a monomer for the preliminary polymerization. It is also possible to conduct preliminary polymerization in the presence of hydrogen for controlling the molecular weight, if necessary. Preliminary polymerization is conducted at a temperature of from –78° C. to 100° C., preferably from –78° C. to 50° C. Period for preliminary polymerization is in the range of 1 minutes–24 hours, preferably 5 minutes–10 hours, and the amount of the polymer formed upon the preliminary polymerization is in the range of 0.01 g–500 g, preferably 0.1 g–100 g, more preferably 0.2 g–30 g per g of the catalyst comprising the Components (A) and (B) and the Component (C). If the amount is less than 0.01 g, the effect of the gas phase preliminary polymerization would not appear, so that the catalyst Components (A) and (B) may undesirably tend to fall off the solid catalyst to produce a finely divided particulate polymer. If the amount of the polymer produced at preliminary polymerization excess 500 g, the product is polymeric in nature rather than a solid catalyst, so that the activity is undesirably lowered when used in the main polymerization and the handlings of the catalyst such as feeding techniques, structure of the catalyst tank, etc. become difficult.

[Use of Catalyst/Polymerization of Olefin]

The process according to the present invention can be applied not only to the solvent polymerization in a solvent, but also to the liquid phase solvent-free polymerization, the gas phase polymerization or the mass or molten polymerization wherein no solvent is substantially used. In addition, it is applied to the continuous polymerization or the batchwise polymerization.

As the solvent in the solvent polymerization, saturated aliphatic or aromatic hydrocarbons such as hexane, heptane, pentane, cyclohexane, benzene or toluene are used alone or as a mixture thereof.

In these polymerizations, the gas phase polymerization would more enjoy the advantages inherent in the present invention.

Polymerization temperature is in the range of from $-78°$ to ca. $200°$ C., preferably from $-20°$ to $100°$ C. The pressure of the olefin in the reaction system is not specifically limited, but it is preferably in the range of from atmospheric pressure to 50 kg/cm$^2$·G. During polymerization, it is possible to control the molecular weight by the well-known means such as the selection of temperature or pressure, or the introduction of hydrogen.

In the polymerization, it is needless to say that the catalyst comprising the Components (A) and (B) and monomers for polymerization are sufficient enough for polymerization to take place, but it is also possible to conduct polymerization in the absence of a further organoaluminum compound for the purpose of improving the polymerization activity and preventing the possible intoxication of catalyst.

The organoaluminum compounds for this use include specifically the compounds represented by the formula $R^7_{3-n}AlX_n$ or $R^8_{3-m}Al(OR^9)_m$, wherein $R^7$ and $R^8$, which may be the same or different, represent a hydrocarbon group having 1–20 carbon atoms or a hydrogen atom, $R^9$ represents a hydrocarbon group having 1–20 carbon atoms, X represents a halogen atom, n and m denote a numeral of $0 \leq n \leq 3$, $0 \leq n \leq 3$, respectively, or the compounds represented by the formula [IV] or [V]:

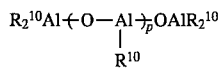  [IV]

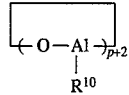  [V]

wherein p denotes a numeral in the range of 0–50, preferably 2–25, and $R^{10}$ represents a hydrocarbon group, preferably having 1–10 carbon atoms, particularly 1–4 carbon atoms.

Specific examples of these organoaluminum compounds include (a) trialkylaluminums such as trimethylaluminum, triethylaluminum, triisobutylaluminum, trihexylaluminum, trioctylaluminum, tridecylaluminum; (b) alkylaluminum halides such as diethylaluminum monochloride, diisobutylaluminum monochloride, ethylaluminum sesquichloride and ethylaluminum dichloride; (c) alkylaluminum hydrides such as diethylaluminum hydride and diisobutylaluminum hydride; (d) aluminum alkoxides such as diethylaluminum ethoxide and diethylaluminum phenoxide; (e) alumoxanes such as methylalumoxane, ethylalumoxane, isobutylalumoxane and methylisobutylalumoxane. It is also possible to use as a mixture two or more of these organoaluminum compounds in one of the groups (a)–(e) and/or in some of groups of the groups (a)–(e). Among these compounds, a trialkylaluminum and an alumoxane are preferred.

Other ingredients or components which can be incorporated in addition to the Components (A), (B) and (C) and the optional organoaluminum compounds include active hydrogen containing compounds such as H$_2$O, methanol, ethanol and butanol, electron donor compounds such as ethers, esters and amines, and alkoxy containing compounds such as phenyl borate, phenyl phosphite, tetraethoxysilane and diphenyldimethoxysilane.

[Use of Catalyst/Polymerization of Olefin (Bis)]

The propylene block copolymers according to the present invention are prepared by conducting the polymerization step (1) in the presence of the catalyst according to the present invention, and then conducting the polymerization step (2) in the presence of the above described catalyst and the polymer both coming from the polymerization step (1). Thus, the polymerization step (1) is the former polymerization step, which is the process for preparing a rubbery polymer according to the present invention.

<Making up of Catalyst>

The catalyst used in the process of the present invention is made up by bringing the above described catalyst components and the ingredients used upon necessity into contact at a time or stepwise in or outside the polymerization system.

Polymerization Step (1)

The polymerization step (1) as the former step is a process for preparing a copolymer of propylene with a comonomer which is ethylene and/or an α-olefin having 4–20, preferably 4–10, carbon atoms having a content of the comonomer in a molar ratio of 20–100, preferably 30–80, more preferably 30–70 in one step or in multi-steps by introducing pertinent monomers, which are propylene and at least one comonomer selected from the group consisting of ethylene and an α-olefin having 4–20 carbon atoms. In this step, a copolymer is formed in an amount of 5–70% by weight, preferably 10–50% by weight, more preferably 10–40% by weight, of the total polymerization amount.

In the polymerization step (1), polymerization temperature is in the range of $0°–90°$ C., preferably $20°–70°$ C. A polymerization pressure is generally in the range of 1–50 kg/cm$_2$·G.

Polymerization Step (2)

The polymerization step (2) as the latter step is a process which is a continuation of the step (1) in that the step (2) is conducted in the presence of the catalyst used in and the polymer produced in the step (1), namely in utilization of polymerization activity, i.e. of a portion of the polymerization catalyst, retained, and which to form a crystalline propylene homopolymer or a copolymer of propylene with at least one comonomer selected from the group consisting of ethylene and an α-olefin having 4–20 carbon atoms, preferably 4–10 carbon atoms of the comonomer content of 10% by weight or less, preferably 5% by weight or less, in an amount of 30–95% by weight, preferably 50–90% by weight, more preferably 60–90% by weight of the total polymerization amount.

In the polymerization step (2), if the comonomer content in the propylene copolymer exceeds 10% by weight, the rigidity of the copolymer obtained is lowered and the amount of low crystalline polymers as by-products is extensively increased. When the polymerization amount is less than the lower limit described above, the amount of low crystalline polymers as the by-products is increased as well. On the other hand, when the polymerization amount exceeds the upper limit, the effect of improving the impact strength in the block copolymer will not be observed significantly.

When the polymerization is switched from the step (1) into the step (2), the monomer gases used in the polymerization step (1) and optionally a molecular weight modifier such as hydrogen gas are preferably purged before the start of the polymerization step (2).

The polymerization step (2) may be conducted either with or without the molecular weight modifier.

[Block Copolymer]

<Polymer in the Former Step>

The polymer obtained in the polymerization step (1) of the present invention is characterized in that the copolymerization ratio ($r_p \times r_{EN}$) of the polymer obtained by the cold xylene extraction is in the range of 2.0 or less, preferably 1.0 or less. The reaction ratio of monomers is the product of $r_p$ and $r_{EN}$ calculated according to the equations of $r_p = 2[PP]/[PE]X$ and $r_{EN} = 2[EE]X/[PE]$, wherein X is a propylene/ethylene molar ratio in the same manner as in the case of the copolymerization of propylene and ethylene by K. Soga, Macromol. Chem., 191, 2854 (1990). In this connection, when the former step comprises polymerization with a solvent used the amount of propylene dissolved in the solvent was calculated according to the Kissin's equation described by Y. V. Kissin, "Isospecific Polymerization of Olefins with Heterogeneous Ziegler-Natta Catalysts", p. 3 (1985). The value of $r_p \times r_{EN}$ is required to be in the range of 2.0 or less, preferably 1.5 or less.

In addition, the polymer prepared according to the polymerization step (1) has a number average molecular weight of 20,000 or more, preferably 50,000 or more. If the molecular weight is less than 20,000, impact resistance is improved less effectively and thus the effect as the object of the present invention would not be obtained.

<Polymer in the latter step>

The polymer obtained in the polymerization step (2) is a stereoregular polymer having an [mm] triad fraction of 0.80 or higher, preferably 0.85 or higher, more preferably 0.90 or higher, or a [rr] triad of 0.80 or higher, preferably 0.85 or higher, more preferably 0.90 or higher, according to the $^{13}$C-NMR measurement. The [mm] or [rr] of the polymer according to the $^{13}$C-NMR spectrometry were measured with a JEOL, FX-200 spectrometer manufactured by Japan Electron Optics Laboratory, Co., Ltd. under a measuring temperature of 130° C., a measuring frequency of 50.1 MHz, a spectrum width of 8,000 Hz, a pulse repeating interval of 2.0 seconds, a pulse width of 7 μsecond and scannings of 10,000–50,000. Spectrum was analyzed according to the methods described by A. Zambelli, Macromolecules, 21, 617 (1988) and Tetsuro Asakura, Abstract of The Soc. of Polymer Sci., Japan, 36, (8), 2408 (1987).

The [mm] fraction or [rr] fraction of triad means the ratio (y/x) of the number (y) of the triad having the [mm] or [rr] structure to the total number (x) of "triad" or "terpolymer unit" which is a minimum unit of a stereostructure in the monomer units of an α-olefin polymer and has three stereoisomeric structures of isotactic [mm], heterotactic [mr] and syndiotactic [rr].

The polymer prepared according to the polymerization step (2) has a number average molecular weight (Mn) in the range of 20,000–200,000. If Mn is less than 20,000, the molten polymer has an unsatisfactory viscosity for molding. If it exceeds 200,000, high rigidity as the object of the present invention would not be maintained. The polymer has preferably the number average molecular weight in the range of 30,000–100,000.

The polymer obtained has a molecular weight distribution such that the ratio Mw/Mn is in the range of 3.5 or less, preferably 1–2.8 according to the measurement in gel permeation chromatography (GPC). The polymer obtained with a catalyst comprising a metallocene compound and an alumoxane has generally the ratio Mw/Mn in the range of 3.5 or less. If the polymer has the ratio exceeding 3.5, the yield of low molecular weight products are relatively increased, resulting undesirably in the increased amount of by-products or the difficulty in increasing rigidity.

In this connection, the measurement of gel permeation chromatography (GPC) was conducted according to the method described by Takeuchi in "Gel Permeation Chromatography", Maruzen. That is to say, a standard polystyrene having a known molecular weight (monodispersed polystyrene, manufactured by Toyo Soda K. K., Japan) was used, and the value of the weight average molecular weight (Mw)/number average molecular weight (Mn) was obtained by the universal method. Measurements were conducted with a Waters 150°C.-ALC/GPC apparatus. Three columns AD80M/S (manufactured by Showa Denko K. K., Japan) were used. Samples diluted to 0.2% by weight with o-dichlorobenzene were used in an amount of 200 μl. Measurements were conducted at 140° C. at a flow rate of 1 ml/min.

MEASUREMENT OF PHYSICAL PROPERTIES FOR PRACTICAL USE

Practical physical properties of polymers in the following examples were evaluated as follows. After the following additives were added to the polymer obtained in each example, the mixture having a composition shown in Table 1 was kneaded in a plastomill having an internal volume of 60 ml (manufactured by Toyo Seiki) under the condition of 230° C. and the rotation speed of 60 rpm for 6 minutes. The mixture thus obtained was press-molded at 230° C. to form a sheet product having a thickness of 2 mm, which was cut into various test pieces for the evaluation of the physical properties.

Additives: 2,6-di-tert-butylpheno10.10% by weight
RA1010 (Ciba-Geigy)0.05% by weight
Measurement and Evaluation
(a) Flexural modulus of elasticity A sheet was cut into a test piece with a width of 25 mm and a length of 80 mm, and measurements were carried out with an Instron tester according to JIS K7203.
(b) Izod impact strength Izod impact strength with notch at 23° C. of three layered test pieces having a thickness of 2 mm was measured according to JIS K7110.

\<Example 1\>

Preparation of the Component (A)

Dimethylsilylenebis(2-metdilindenyl)zirconium dichloride was prepared by the following method.

In a 500 ml glass reactor, 4.3 g (33 mmole) of 2-methylindene was dissolved in 80 ml of tetrahydrofuran, to which 21 ml of 1.6M n-butyllithium in hexane was slowly added under cooling. After the mixture was stirred at room tempearture for 1 hour, it was cooled again, and 2.1 g of dimethyldichlorosilane was added dropwise. After the mixture was stirred at room temperature for 12 hours, 50 ml of water was added, and the organic phase was separated and dried to give 3.5 g of dimethylbis(2-methylindenyl)silane.

After 3.5 g of dimethylbis(2-methylindenyl)silane obtained by the method described above was dissolved in 7.0 ml of tetrahydrofuran and cooled, 13.9 ml of 1.6M n-butyllithium in hexane was slowly added dropwise. After the mixture was stirred at room temperature for 3 hours, it was added dropwise to a solution of 2.6 g (11 mmoles) of zirconium tetrachloride in 60 ml of tetrahydrofuran. The mixture was stirred for 5 hours, and after blowing the hydrogen chloride gas it was dried. Methylene chloride was then added to separate solubles, which were crystallized at a low temperature to give 0.45 g of orange product as powder.

Preparation of the Component (B)

Methylisobutylalumoxane as the ingredient (i) was prepared by the following method.

Into a 1,000 ml flask purged thoroughly with nitrogen and equipped with a stirrer, a reflux condenser and two dropping funnel, 100 ml of toluene which had been desiccated and deoxygenated was introduced. Into one of the two dropping funnels were introduced 50 ml of a solution of 0.72 g (10 mmole) of trimethylaluminum and 1.96 g (10 mmole) of triisobutylaluminum in toluene, and into the other funnel was introduced water-saturated toluene. The mixed aluminum solution and the water-saturated toluene were fed at an equimolar rate based on Al and $H_2O$ at 30° C. over a period of 3 hours. After the toluene solutions were fed, the mixture was heated to 50° C. and reacted for 2 hours. After the reaction, the solvent was removed by distillation under a reduced pressure to give 1.9 g of a white solid. The white solid thus obtained was diluted with toluene for measuring $^{27}Al$-NMR spectrum, which showed a chemical shift at 174 ppm and a half height width of 5,844 Hz.

Making up of a catalyst

As the Component (C), porous polypropylene powder manufactured by Akzo (trade name: "Accurel", 200–400 μm) was used. The pore volume of the powder of a pore diameter of 0.05–2.0 μm was 1.89 cc/g, and the whole pore volume of 0.006–10 μm was 2.54 cc/g.

Into a 300 ml flask purged thoroughly with nitrogen was introduced 10 g of the porous polypropylene manufactured by Akzo as the Component (C) and a solution of about 3.6 g (0.045 mole) of methylisobutylalumoxane synthesized above as the Component (B) in 40 ml of toluene. Next, 42 mg (0.94 mmole) of dimethylsilylenebis(2-methylindenyl)-zirconium dichloride synthesized above as the Component (A) was introduced under cooling at 0° C. over a period of 15 minutes. After introduction, toluene was removed by distillation with stirring under a nitrogen stream for 2 hours while maintainin9 the temperature at 10° C. or less so that the mass of the polypropylene particles were fluid. When a portion of the mass was taken out and dried under reduced pressure, reduction in the weight by 12% by weight was found and toluene was recovered in the cooling trap used.

The catalyst having undergone the impregnation was subjected to preliminary polymerized in a flow system in which propylene was polymerized. Preliminary polymerization was conducted under cooling with ice-water and controlling the flow rate of the propylene gas at 10°–20° C. for 30 minutes. Polymerization temperature was controlled by dilution of propylene with nitrogen in the flowing gas as well as by cooling with ice-water. After the preliminary polymerization, solids were recovered in a yield of 11.5 g. The solid had a content of the Component (A) of 1.58 mg/g. Thus, the yield of preliminary polymerization was about 290 g per the Component (A).

Production of a Propylene Block Copolymer

Into an autoclave equipped with a stirring means of an internal volume of 1.5 liters was added 100 g of table salt which had been thoroughly desiccated and purged with nitrogen, and the autoclave was heated to 30° C. and purged with propylene. A 2 g portion of the solid catalyst (containing the polymer formed at the preliminary polymerization) obtained above was introduced, followed by introduction of a gaseous mixture of propylene/ethylene=4/1 (molar ratio) to conduct the polymerization process (1) at a pressure of 7 kg/cm$^2$·G for 30 minutes. The gas within the system was removed and the system was purged with propylene gas, and then hydrogen was added at 20° C., propylene pressure was raised to 9 kg/cm$^2$·G, and the polymerization process (2) was conducted at 40° C. under a gas phase for 1.5 hours. After the polymerization, solid product was collected for washing off the table salt with a large amount of water and dried to give 56.5 g of a propylene block copolymer. The copolymer had a bulk density of 0.35 (g/cc) and an MFR of 32.2 (g/10 min).

A 2 g portion of the polymer obtained was added to 300 ml of xylene, heated to 130° C. to dissolve it and the solution was cooled to 23° C. overnight. Insolubles were removed by filtration, and xylene solubles were recovered to give 42.6% by weight of the former-step polymer, viz, propylene/ethylene copolymer. The cold xylene solubles had a copolymerization ratio $r_E r_p$ of 1.20 and an ethylene content of 62.5% by weight. The number average molecular weight was 105,000 and the Q value was 2.88.

The propylene block copolymer obtained had a flexural modulus of elasticity of 8,700 kg/cm$^2$ and an Izod impact strength of 10.5 (kg·cm/cm$^2$).

The xylene insolubles had a polymer melting point of 142° C. and an [mm] triad of 0.91.

\<Comparative Example 1\>

Production of a propylene block copolymer

To an autoclave equipped with a stirring means of an internal volume of 1.5 liters was added 100 g of sodium chloride which had been thoroughly desiccated and purged with nitrogen, and the autoclave was heated to 40° C. and purged with propylene. Next, 2 g of the solid catalyst obtained above was introduced into the autoclave, propylene pressure was raised to 9 kg/cm$^2$·G, and the polymerization process (1) was conducted for 1.5 hours. The propylene in the autoclave was removed, the temperature was lowered to 30° C., a gaseous mixture of propylene/ethylene in a 1/4 molar ratio was introduced to conduct the polymerization process (2) at a pressure of 7 kg/cm$^2$·G for 30 minutes. After the polymerizaton, the post-treatment was conducted in the same manner as in Example 1 to evaluate the polymer. The results are shown in Table 1.

\<Examples 2 and 3\>

Production of a Propylene Block Copolymer

Polymerization procedure was conducted in the same manner as in Example 1, except that 2 g of the solid catalyst and 0.1 g of methylalumoxane manufactured by Toso-Akzo, or 0.14 g of triisobutylaluminum in 1 ml of toluene were used. The results obtained are shown in Table 1.

<Example 4>

Preparation of the Component (A)
Synthesis of dimethylsilylenebis(2-methyltetrahydroindenyl)zirconium dichloride A 0.5 g portion of dimethylsilylenebis(2-methylindenyl)zirconium dichloride obtained in Example 1 was dissolved in 250 ml of dichloromethane and introduced into a 1.0 liter autoclave, and 0.5 g of platinum oxide was then introduced. Hydrogen pressure was increased to 50 kg/cm$^2$·G to carry out hydrogenation at 30° C. for 4 hours. After the reaction was completed, the slurry was filtered to separate the platinum catalyst, and the solvent was removed by distillation. The product was dissolved in 200 ml of toluene, and the solution was concentrated into about 50 ml, which was left standing overnight at −20° C. to form crystals. The crystals formed were filtered, and desiccated to give 0.22 g of the title product.

Preparation of a Solid Catalyst 10 g of porous polypropylene powder (trade name: Accurel, <200 μm, manufactured by Akzo) was used as the Component (C), to which 0.1 mole of MMAO (type 3, manufactured by Toso-Akzo) based on the Al atom and 48.4 mg (0.1 mmole) of dimethylsilylenebis(2-methyl-4,5,6,7-tetrahydroindenyl)zirconium dichloride obtained above were sequentially added in the form of a toluene dilution, toluene was removed by distillation for 1 hour to give the solid catalyst desired. The catalyst contained the Component (A) in an amount of 1.88 mg/g.

Production of a Propylene Block Copolymer

Polymerization procedure was conducted in the same manner as in Example 1, except that 1 g of the solid catalyst obtained above was used and 20 ml of hydrogen was not used. The result are shown in Table 2.

<Examples 5–9>

Polymerization procedure was conducted in the same manner as in Example 1, except that the amounts of propylene, ethylene and hexene, the polymerization temperature, the polymerization period in the former step polymerization, and the polymerization period in the polymerization process (2) were changed into those specified in Table 2. The results are shown in Table 2.

<Example 10>

Production of a Propylene Block Copolymer

Into a 10 liter autoclave equipped with a stirrer were introduced 3 liters of n-heptane, 50 mmole of MMAO, manufactured by Toso Akzo, based on an Al atom and 6 μmole of dimethylsilylenebis(2-methyl-4,5,6,7-tetrahydroindenyl)zirconium dichloride synthesized in Example 4.

As the polymerization process (1), propylene and ethylene were fed at a rate of 120 g/hr and 180 g/hr, respectively, for 20 minutes at 30° C. After the feeding, post polymerization was conducted for 1 hour. The monomers were removed from the autoclave, and the autoclave was purged with nitrogen gas three times. Next, 2 liters of n-heptane was added, propylene was fed at a rate of 800 g/hr for 80 minutes at 35° C. After the feeding, polymerization was continued for further 3 hours. After the polymerization, 40 ml of BuOH was added to conduct reaction for 30 minutes. Slurries were recovered, the solvent was removed by steam stripping and the solid product obtained was dried to give 210 g of a polymer. The polymer had an MFR of 4.5, a fraction extracted with cold xylene of 44.2% by weight, an ethylene content in the cold xylene extract of 50% by weight, $r_E r_p$ of 0.92, the number average molecular weight of 89,000 and the Q value of 2.20. The xylene insolubles had a melting point of 153° C. and an [mm] triad of 0.965. The flexural modulus of elasticity was 7,500 kg/cm$^2$. The Izod impact strength was such that no break took place at 23° C. and was 6.5 kg·cm/cm$^2$ at −30° C. The sheet formed with the polymer showed no stickiness on the surface after left standing for 1 month.

<Comparative Example 2>

Polymerization procedure was conducted in the same manner as in Example 10, except that the sequence of the steps was inverted. As a result, a propylene block copolymer was recovered in an amount of 300 g. The polymer showed an MFR of 15.8, a cold xylene extract of 54.5% by weight, an ethylene content in the cold xylene soluble of 25.5% by weight, an $r_E r_p$ of 1.85, the number average molecular weight of 55,300 and the Q value of 2.56. The xylene insoluble had a melting point of 152.3° C. and an [mm] triad of 0.960. The flexural modulus of elasticity was 5,600 kg/cm$^2$. The Izod impact strength was 2.3 kg·cm/cm$^2$ at −30° C.

TABLE 1

| | Solid Catalyst (Component (A) Used) | Optional Ingredient | Catalyst Activity (g Polymer/ g Component (A)) | Bulk Density (g/cc) | MFR (g/ 10 min) | Cold Xylene Extract | | | Cold Xylene Insoluble | | Flexural Modulus (Kg/cm$^2$) | Izod Impact Strength (23° C.) (Kg − cm/cm$^2$) |
|---|---|---|---|---|---|---|---|---|---|---|---|---|
| | | | | | | Content (% by weight) | Ethylene Content | $r_E r_P$ | Melting Point (°C.) | [mm] triad | | |
| Example 1 | 2 g (3.16 mg) | none | 17,800 | 0.35 | 32.2 | 42.6 | 62.5 | 1.20 | 142 | 0.91 | 8,700 | 12.3 |
| Comparative Example 1 | 2 g (3.16 mg) | none | 12,600 | 0.26 | 27.5 | 37.5 | 63.4 | 1.36 | 143 | 0.92 | 8,300 | 5.1 |
| Example 2 | 2 g (3.16 mg) | Toso-Akzo MMAO 0.1 g | 31,500 | 0.37 | 25.2 | 45.3 | 66.2 | 1.11 | 143 | 0.92 | 8,400 | 15.5 |

TABLE 1-continued

| | Solid Catalyst (Component (A) Used) | Optional Ingredient | Catalyst Activity (g Polymer/ g Component (A)) | Bulk Density (g/cc) | MFR (g/ 10 min) | Cold Xylene Extract Content (% by weight) | Ethylene Content | $r_E r_P$ | Cold Xylene Insoluble Melting Point (°C.) | [mm] triad | Flexural Modulus (Kg/cm²) | Izod Impact Strength (23° C.) (Kg – cm/cm²) |
|---|---|---|---|---|---|---|---|---|---|---|---|---|
| Example 3 | 2 g (3.16 mg) | Toso-Akzo Triisobutyl-aluminum 0.15 g | 24,500 | 0.36 | 38.1 | 40.1 | 62.0 | 1.38 | 141 | 0.90 | 8,200 | 10.5 |

TABLE 2

| | Polymerization Step (1) | | | Polymerization Step (2) | | Polymerization Activity | | | | Cold Xylene | | | Izod Impact Strength |
|---|---|---|---|---|---|---|---|---|---|---|---|---|---|
| | Period (Hr) | Propylene/ Ethylene/ Hexene | Temperature (°C.) | Period (Hr) | Temperature (°C.) | (g Polymer/ g Component (A)) | Bulk Density (g/cc) | MFR (g/10 min) | Extract/ Ethylene Content | Melting Point (°C.) | Flexural Modulus (Kg/cm²) | (23° C.) (Kg – cm/cm²) | |
| Example 4 | 0.5 | 1/4/0 | 30 | 1.5 | 40 | 41,600 | 0.41 | 11.0 | 38.5/68.1 | 145 | 10,500 | 14.7 | |
| Example 5 | 0.5 | 1/3/0 | 30 | 1.5 | 40 | 38,600 | 0.38 | 20.3 | 32.6/60.4 | 144 | 10,400 | 13.6 | |
| Example 6 | 0.5 | 1/2/0 | 30 | 1.5 | 40 | 33,000 | 0.36 | 27.5 | 31.8/52.2 | 144 | 10,700 | 12.5 | |
| Example 7 | 0.5 | 1/4/0.05 | 30 | 1.5 | 40 | 38,300 | 0.36 | 12.5 | 41.2/66.6 | 143 | 10,100 | 14.4 | |
| Example 8 | 0.5 | 1/4/0 | 40 | 1.5 | 40 | 47,700 | 0.36 | 27.0 | 48.8/71.4 | 145 | 9,500 | 15.3 | |
| Example 9 | 0.25 | 1/4/0 | 30 | 3.0 | 40 | 42,000 | 0.42 | 8.6 | 18.5/67.5 | 146 | 11,600 | 8.5 | |

<Example 10>

Preparation of Component (A)

Synthesis of dimethylsilylenebis(2-methyl-4,5-benzoindenyl)zirconium dichloride:

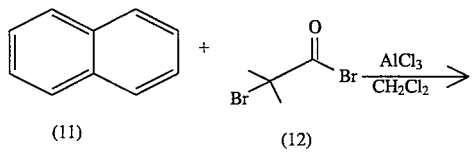

(11)      (12)

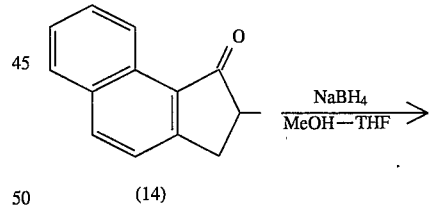

(13)  separation

-continued

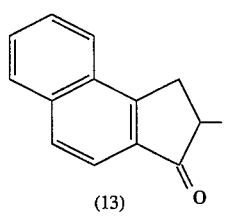

(14)

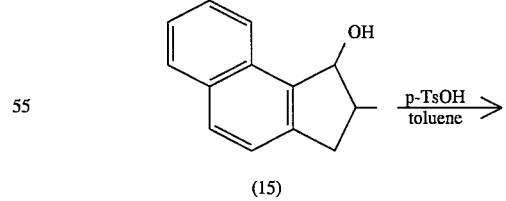

(15)

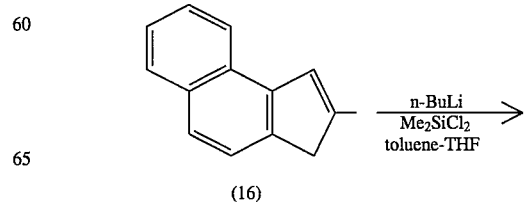

(16)

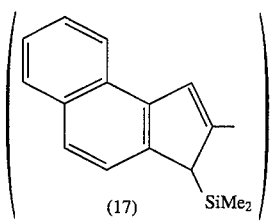

The title compound was synthesized in accordance with the method described in EP 0545304A1.

36.4 g (273 mmol) of aluminum chloride was weighed in a reactor which had been purged inside with argon. To the aluminum chloride, 264 ml of a solution of 13.9 g (109 mmol) of naphthalene (11) and 25 g (109 mmol) of alpha-bromoisobutyrylbromide (12) in methylene chloride was slowly added dropwise at room temperature. The mixture was stirred overnight, and, on the following day, poured into ice water. To this mixture was added 250 ml of methylene chloride, and the resulting mixture was subjected to separation with concentrated hydrochloric acid. The mixture was emulsified, so that it was filtered through Celite. The organic phase was washed with a saturated aqueous solution of sodium hydrogencarbonate, and dried over magnesium sulfate. The solvent was then removed under reduced pressure to obtain 25.01 g of the crude product (isomer ratio 92:8). The product was purified by column chromatography (available from Merck Corp., solvent: toluene). Major product (14)12.36 g (58%); minor product (13)1.0554 g (5%).

$^1$H-NMR (300 MHz, CDCl$_3$)

Major isomer (14):

1.37 (d, 3H, J=7.3 Hz), 2.76–2.87 (m, 2H), 3.47 (dd, 1H, J=8.1 and 18.3 Hz), 7.49 (d, 1H, J=8.4 Hz), 7.55 (ddd, 1H, J=1.3, 7.0 and 8.2 Hz), 7.66 (ddd, 1H, J=1.4, 7.0 and 8.4 Hz), 7.88 (dd, 1H, J=1.4 and 8.2 Hz), 8.03 (d, 1H, J=8.4 Hz), 9.15 (dd, 1H, J=1.3 and 8.4 Hz)

Minor isomer (13):

1.41 (d, 3H, J=7.5 Hz), 2.88 (ddq, 1H, J=3.3, 17.6 and 7.5 Hz), 3.02 (dd, 1H, J=3.3 Hz), 3.74 (dd, 1H, J=7.44 and 17.6 Hz), 7.61–7.71 (m, 2H), 7.75 (d, 1H, J=8.5 Hz), 7.82 (d, 1H, J=8.3 Hz), 7.94–7.97 (m, 1H), 8.03–8.06 (m, 1H)

2.36 g (63 mmol) of the benzoindanone (14) was dissolved in 300 ml of THF and 150 ml of this solution this solution was added 3.6 g (95 mmol) of sodium borohydride at room temperature. After the mixture was stirred for 6 hours, the reaction was terminated by dilute hydrochloric acid. The reaction mixture was subjected to separation with hexane (100 ml×2) and ether (100 ml×2). The organic phase was washed with a saturated aqueous sodium chloride solution, and dried over magnesium sulfate. The solvent was then removed under reduced pressure to obtain the mixture (15) of two types of stereoisomers. This mixture was used in the subsequent reaction without purification.

$^1$H-NMR (300MHz, CDCl$_3$)

1.25 (d, 3H, J=7.0 Hz) (major isomer), 1.32 (d, 3H, J=7.1 Hz) (minor isomer), 2.45–3.48 (m, 2H), 5.29 (dd, 1H, J=3.9 and 8.2 Hz) (major isomer), 5.52 (dd, 1H, J=6.5 and 6.5 Hz) (minor isomer), 7.34–8.26 (m, 6H)

The crude product, benzoindanol (15), was dissolved in 200 ml of toluene. To this solution was added 1.2 g (6.3 mmol) of p-toluenesulfonic acid, and the mixture was stirred at 80° C. for 15 minutes. The reaction was terminated by a saturated aqueous solution of sodium hydrogencarbonate. The reaction mixture was subjected to separation with toluene. The organic phase was washed with a saturated aqueous solution of sodium hydrogencarbonate and a saturated aqueous sodium chloride solution, and dried over magnesium sulfate. The solvent was then removed under reduced pressure to obtain 12.6 g of the crude product (16). The product was purified by column chromatography (available from Merck Corp., solvent: hexane-ethyl acetate 0–1%). 9.66 g (85%).

$^1$H-NMR (300 MHz, CDCl$_3$)

2.27 (d, 3H, J=1.3 Hz), 3.45 (s, 2H), 7.07–7.09 (m, 1H), 7.39–7.51 (m, 2H), 7.54 (d, 1H, J=8.2 Hz), 7.61 (d, 1H, J=8.2 Hz), 7.84–7.88 (m, 1H), 8.02–8.07 (m, 1H)

0.41 g (2.3 mmol) of the benzoindene (16) was weighed in a reactor replaced with argon, and dissolved in 6.2 ml of toluene and 0.3 ml of THF. To this solution was added 1.4 ml (2.3 mmol) of n-butyl lithium (as a 1.65 M hexane solution) at room temperature, and the mixture was stirred at 80° C. for one hour. Thereafter, 0.14 ml (1.14 mmol) of dichlorodimethylsilane was added to the mixture at 0° C., and the resulting mixture was stirred at 80° C. for one hour. The reaction was terminated by water. The reaction mixture was extracted with ether, and the organic phase was dried over magnesium sulfate. The solvent was then removed under reduced pressure to obtain the crude product (17). The product was purified by silica gel column chromatography (available from Merck Corp., solvent: hexane-methylene chloride 15%). 0.1865 g (39%). The purified product was then recrystallized from ether.

0.0496 g (10%).

$^1$H-NMR (300 MHz, CDCl$_3$)

−0.36 (s, 3H) (RS), −0.34 (s, 6H) (RR), −0.27 (s, 3H) (RS), 2.34 (d, 3H, J=1.2 Hz) (RR), 2.40 (d, 3H, J=1,2 Hz) (RS), 4.00 (br, s, 1H) (RS), 4.02 (br, s, 1H) (RR), 7.26 (s, 1H) (RS and RR), 7.40–7.62 (m, 4H) (RS and RR), 7.85–7.91 (m, 1H) (RS and RR), 8.10–8.16 (m, 1H) (RS and RR)

0.92 g of the above-obtained bis(2-methyl-4,5-benzoindenyl)dimethylsilane was dissolved in 25 ml of tetrahydrofuran, and the solution was cooled to −78° C. To this solution, 3.0 ml of n-butyl lithium diluted with hexane (1.7M) was added dropwise, and the temperature of the mixture was raised to room temperature over a period of 3 hours. Thereafter, the solvent was distilled off under reduced pressure. To the residue was added 100 ml of dichloromethane, and the mixture was cooled to −78° C. Subsequently, 0.51 mg of zirconium tetrachloride was slowly added to the mixture. The temperature of the resulting mixture was raised to room temperature over a period of 5 hours, and reaction was carried out overnight at room temperature. After the reaction was completed, the solid was filtered off. The supernatant liquid was evaporated to dryness under reduced pressure, and the residue was washed three times with 20 ml of toluene. 30 ml of dichloromethane was added to the washed product. The product was thus dissolved in and recrystallized from the dichloromethane to obtain 0.21 g of an orange solid. It was confirmed by a $^1$H-NMR spectrometer that this product was rac-dimethylsilylenebis(2-methyl-4,5-benzoindenyl)zirconium dichloride.

$^1$H-NMR (300 MHz, CDCl$_3$) δ 1.36 ppm (s, 6H), δ 2.37 (s, 6H), δ 7.27–7.97 ppm (m, 12H)

Production of Solid Catalyst

In the same manner as in Example 1, a solid catalyst was obtained by using 57.6 mg (0.1 mmol) of the above-obtained dimethylsilylenebis(2-methyl-4,5-benzoindenyl)zirconium dichloride and a porous polypropylene powder manufactured by AKZO N. V. The catalyst obtained was found to contain 0.57 mg/g of the Component (A).

Production of Propylene Block Copolymer

Polymerization was conducted under the same conditions as in Example 1 except that 5 g of the above-obtained solid catalyst was used, that the 1st-step polymerization and the 2nd-step polymerization were conducted at 50° C. and that 20 ml of hydrogen used in Example 1 was not used. The results are as shown in Table 3.

<Example 12>

Production of Solid Catalyst

Silica supporting MAO manufactured by Witco Corp. was used to provide the Component (C).

To a 300-ml flask thoroughly replaced with nitrogen, 150 ml of dehydrated and deoxidized n-heptane was introduced. 6 g of the MAO-supporting silica manufactured by Witco Corp., was added to and suspended in the n-heptane. To this suspension was added dropwise a solution of 91.7 mg of the dimethylsilylenebis(2-methyl-4,5-benzoindenyl)-zirconium dichloride synthesized in Example 10 in toluene. Subsequently, 1.5 g of triisobutylaluminum was added to the mixture, and the resulting mixture was stirred at 25° C. for two hours.

After two hours, propylene was introduced to the flask, and preliminary polymerization was conducted at 30° C. for 15 minutes. The solid catalyst component thus obtained was washed three times with heptane. The heptane was removed at room temperature, and the residue was collected. As a result, 14.5 g of a solid was obtained. The solid was found to contain 1.49 mg/g of the Component (A).

Production of Propylene Block Copolymer

Polymerization was conducted under the same conditions as in Example 1 except that 2 g of the above-obtained solid catalyst was used, that the 1st-step polymerization was conducted at 50° C. at a pressure of 5 kg/cm²G and the 2nd-step polymerization was conducted at 50° C. and that 20 ml of hydrogen used in Example 1 was not used. The results are as shown in Table 3.

<Example 13>

Preparation of Component (A)
Dimethylsilylenebis(2-methyl-4-phenylindenyl)zirconium dichloride, the component (A), was synthesized in the following manner:

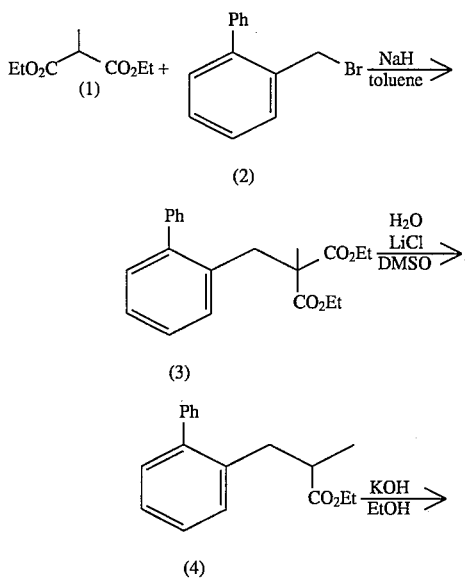

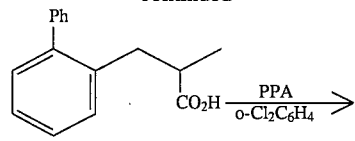

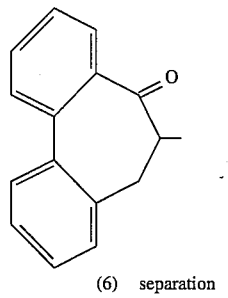

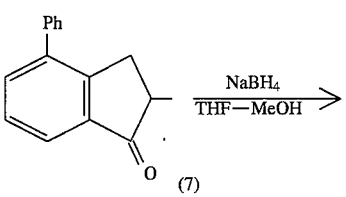

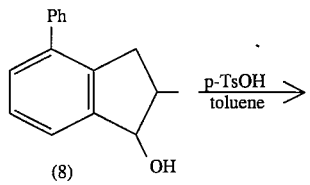

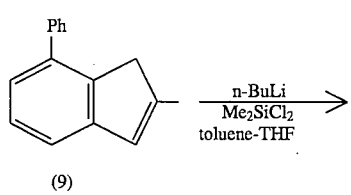

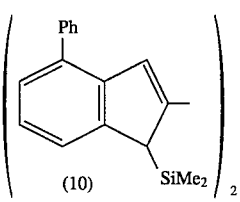

8.9 g (223 mmol) of sodium hydride was weighed in a reactor purged with nitrogen, and suspended in 50 ml of toluene. To this suspension, 25 ml of a solution of 38.3 ml (223 mmol) of diethyl methylmalonate (1) in toluene was slowly added dropwise over a period of one hour while cooling the reactor. After the mixture was stirred at room temperature for 3 hours, 25 ml of a solution of 50 g (202 mmol) of 2-(bromo-methyl) biphenyl (2) in toluene was added dropwise to the mixture. Reaction proceeded almost completely due to the heat of the reaction. The reaction mixture was poured into ice water to terminate the reaction. The mixture was extracted with toluene, and the organic phase was dried over magnesium sulfate. The solvent was then removed under reduced pressure to obtain the crude product (3).

$^1$H-NMR (CDC$_{13}$, 300 MHz )δ 0.94 (s, 3H ), 1.19 (t, 6H, J=7.1 Hz), 3.44 (s, 2H), 4.08 (dq, 2H, J=18.8 and 7.1 Hz), 4.11 (dq, 2H, J=18.8 and 7.1 Hz), 7.12–7.44 (m, 9H)·

Subsequently, 17.15 g (405 mmol) of lithium chloride and 3.6 ml (202 mmol) of water were added to the diester (3) (in an amount corresponding to 202 mmol), and the mixture was heated to 160°–170° C. in 300 ml of dimethylsulfoxide. After 17 hours, the solvent was removed under reduced pressure, and the residue was subjected to separation with water and toluene. The organic phase was washed with water, and dried over magnesium sulfate. The solvent was then removed under reduced pressure to obtain the crude product (4).

$^1$H-NMR (CDCl$_3$, 300 MHz)δ 0.95 (d, 3H, J=7.0 Hz), 1.11 (t, 3H, J=7.1Hz), 2.47 (ddq, 1H, J=7.6, 7.5 and 7.0 Hz), 2.71 (dd, 1H, J=7.6 and 13.9 Hz), 3.01 (dd, 1H, J =7.5 and 13.9 Hz), 3.99 (q, 2H, J=7.1Hz), 7.15–7.45 (m, 9H)

The monoester (4) (in an amount corresponding to 202 mmol) and 17.9 g (304 mmol) of potassium hydroxide were dissolved in 200 ml of ethanol. After refluxed for 6 hours, the solution was subjected to separation with hydrochloric acid, hexane and ether. The organic phase was dried over magnesium sulfate. The solvent was then removed under reduced pressure to obtain the crude product (5). 46.91 g (3 steps, 97%).

$^1$H-NMR (CDCl$_3$, 300 MHz)δ0.96 (d, 1H, J=7.2 Hz), 2.50 (ddq, 1H, J=7.0, 8.0 and 7.2 Hz), 2.69 (dd, 1H, J=8.0 and 14.0 Hz), 3.08 (dd, 1H, J=7.0 and 14.0 Hz), 7.18–7.44 (m, 9H)

184 g of polyphosphoric acid was added to 46 g (191 mmol) of the carboxylic acid (5), and the mixture was dissolved in 230 ml of o-dichlorobenzene. The solution was stirred by a mechanical stirrer at 140° C. for 4 hours. The reaction was terminated by 300 ml of water. To the reaction mixture was added 300 ml of hexane. The mixture was filtered through Celite, and extracted with ether. The organic phase was washed with water, and dried over magnesium sulfate. The solvent was then removed under reduced pressure to obtain the crude product (5-membered ring (7): 7-membered ring (6)=3:1). The product was purified by silica gel column chromatography (solvent: hexane-ethyl acetate 0.20%). Portion containing 5-membered ring (7) only: 7.6287 g (18%).

$^1$H-NMR (CDCl$_3$, 300 MHz)δ1.31 (d, 3H, J=7.3 Hz), 2.66–2.83 (m, 2H), 3.43 (dd, 1H, J=7.7 and 17.0 Hz), 7.35–7.53 (m, 6H), 7.61 (dd, 1H, J=1.3 and 7.4 Hz), 7.78 (dd, 1H, J=1.1 and 7.5 Hz)

7.6 g (34 mmol) of the indanone (7) was dissolved in 75 ml of methanol and 150 ml of THF. To this solution was added 2.0 g (52 mmol) of sodium borohydride. The mixture was stirred overnight at room temperature, and then poured into ice water to terminate the reaction. The reaction mixture was subjected to separation with dilute hydrochloric acid and ether. The organic phase was washed with a saturated aqueous sodium chloride solution, and dried over magnesium sulfate. The solvent was then removed under reduced pressure to obtain the crude product (8) as a mixture of two types of stereoisomers.

$^1$H-NMR (CDCl$_3$, 300 MHz)δ major isomer: 1.25 (d, 3H, J=6.8 Hz), 2.21 (dddq, 1H, J=7.7, 7.7, 8.6 and 6.8 Hz), 2.59 (dd, 1H, J=8.6 and 15.7 Hz), 3.12 (dd, 1H, J=7.7 and 15.7 Hz), 4.80 (dd, 1H, J=7.7 and 7.7 Hz), 7.38–7.46 (m, 8H); minor isomer: 1.13 (d, 3H, J=7.1 Hz), 2.51 (dddq, 1H, J=7.1, 7.3, obscure and 7.1Hz), 2.80 (dd, 1H, J=7.1 and 16.1Hz), 2.99 (dd, 1H, J=7.3 and 16.1 Hz), 5.06 (dd, 1H, J=obscure), 7.38–7.46 (m, 8H)

The indanol (8) (in an amount corresponding to 34 mmol) was dissolved in 100 ml of toluene. To this solution was added 0.65 g (3.4 mmol) of p-toluenesulfonic acid, and the mixture was stirred at 60° C. for 20 minutes. The reaction was terminated by a saturated aqueous solution of sodium hydrogencarbonate, and the reaction mixture was extracted with toluene. The organic phase was washed with a saturated aqueous sodium chloride solution, and dried over magnesium sulfate. The solvent was then removed under reduced pressure to obtain the crude product (9). The product was purified by silica gel column chromatography (solvent: hexane-ethyl acetate 0–2%). 4.84 g (2 steps, 68%)

$^1$H-NMR (CDCl$_3$, 300 MHz)δ 2.13 (s, 3H), 3.38 (s, 2H), 6.53 (s, 1H), 7.13 (dd, 1H, J=1.3 and 7.4 Hz), 7.22–7.55 (m, 7H)

0.93 g (4.5 mmol) of the indene (9) was weighed in a reactor replaced with argon, and dissolved in 12.4 ml of dried toluene and 0.6 ml of THF. To this solution was added 2.7 ml (4.5 mmol) of a 1.65M solution of n-butyllithium in hexane at room temperature. The mixture was stirred at 80° C. for one hour, and then cooled at 0° C. 0.26 ml (2.25 mmol) of dichlorodimethylsilane was added to the mixture, and the resulting mixture was stirred at 80° C. for one hour. The reaction was terminated by 6 ml of water, and the reaction mixture was extracted with ether. The organic phase was dried over magnesium sulfate. The solvent was removed under reduced pressure to obtain the crude product (10). The product was purified by silica gel column chromatography (solvent: hexane-methylene chloride 15%) to obtain a mixture of two types of stereoisomers.
0.8873 g (84%)

$^1$H-NMR (CDCl$_3$, 300 MHz)δ −0.20 (d, 3H (RS)), −0.18 (s, 3H (RS)), −0.18 (s, 6H, (RR and SS)), 2.16 (s, 6H, (RS or RR and SS )), 2.24 (s, 6H (RS or RR and SS)), 3.80 (s, 4H, (RS and RR and SS)), 6.79 (s, 2H (RS or RR and SS)), 6.80 (s, 2H (Rs or RR and SS)), 7.13–7.58 (m, 8H (RS and RR and SS))

1.50 g (3.2 mM) of the bis(2-methyl-4-phenylindenyl) dimethylsilane (10) was diluted with 25 ml of toluene. To this, 3.90 ml of n-butyllithium diluted with hexane (1.7M) was added, and the mixture was refluxed for 3 hours. Subsequently, the reaction system was cooled to −40° C., and 0.78 g of zirconium tetrachloride was added to the system. The temperature of the mixture was then raised to room temperature over a period of 4 hours. Thereafter, the mixture was allowed to react overnight at room temperature. After the reaction was completed, the supernatant liquid was separated from the reaction mixture by filtration, and evaporated to dryness to obtain 450 mg of crude crystals. The solid was washed three times with 20 ml of toluene, and solubilized in 20 ml of methylene chloride for recrystallization. As a result, 0.25 g of orange crystals were obtained. It was confirmed by a $^1$H-NMR spectrometer that the compound obtained was a racemic compound.

$^1$H-NMR (CDCl$_3$, 300 MHz)δ 1.32 (s, 6H), δ 2.27 (s, 6H), δ 6.93 (s, 2H), δ7.1–7.7 (m, 16H)

Production of Solid Catalyst

Porous polypropylene powder (Trademark "Accurel", >350 μm) manufactured by AKZO N. V. was used as the Component (C).

To a 300-ml flask thoroughly purged with nitrogen, 10 g of the above "Accurel", the Component (C), and a solution of approximately 3.6 g (0.045 mol with respect to Al atom) of MMAO manufactured by TOSOH AKZO CORPORATION, Japan, in 40 ml of toluene was introduced. The flask was heated at 50° C. for 30 minutes, and 20 mg of the above-synthesized Component (A), viz., dimethylsilylenebis(2-methyl-4-phenylindenyl)zirconium dichloride, was then introduced thereto. The mixture was dried under nitrogen at room temperature for two hours until the particles contained therein began to flow independently, thereby obtaining 16.8 g of the desired solid catalyst.

Production of Propylene Block Copolymer 100 g of sodium chloride thoroughly purged with nitrogen was introduced to a 1.5-liter autoclave equipped with a stirring means. The autoclave was then heated to 50° C., and replaced with propylene three times. Subsequently, 1 ml (0.075 mol) of triisobutyl-aluminum diluted with toluene and 2 g of the above-obtained solid catalyst were introduced to the autoclave, and polymerization was carried out at 50° C. for 30 minutes at a gas mixture (propylene/ethylene =1/4 (molar ratio)) pressure of 7 kg/cm$^2$G. The gas mixture was purged, and the autoclave was replaced with propylene three times. The propylene pressure was raised to 9 kg/cm$^2$G, and the 2nd-step polymerization was carried out for 2 hours in the gas phase. After the polymerization was completed, the solid produced was collected, washed with a large amount of water, and dried. As a result, 54 g of a block copolymer having a bulk density of 0.35 g/ml and an MFR of 7.5 g/10 min was obtained. The amount of cold xylene extract of this polymer was 29% by weight. The xylene-soluble matter was found to have a number-average molecular weight of 68,000, a Q-value of 3.4, an ethylene content of 65% by weight, and $r_1 19\ r_2$ of 1.05. On the other hand, the xyleneinsoluble matter was found to have a number-average molecular weight of 115,000, a Q-value of 2.9, a melting point of 152.0° C., and [mm] of 0.95.

Thereafter, the supernatant liquid was separated by decantation, and washed five times with 200 ml of fresh purified heptane to obtain a solid titanium trichloride composition.

To this titanium trichloride composition was added a mixture of 250 ml of heptane and 99 ml of diisoamyl ether, and reaction was carried out at a temperature of 35° C. for one hour.

After the reaction was completed, the product was washed five times with 200 ml of purified heptane as in the reduction of titanium tetrachloride conducted previously.

To the solid thus obtained was further added a mixture of 150 ml of heptane and 116 ml of titanium tetrachloride, and reaction was carried out at a temperature of 65° C. for 2 hours.

After the reaction was completed, the product obtained was washed three times with 200 ml of purified heptane to obtain the solid catalyst Component (A).

(2) Production of Block Copolymer

A 10-liter autoclave equipped with a strring means was thoroughly purged with nitrogen, and 5 liters of purified n-heptane was then introduced thereto. 2 g of diethylaluminum chloride and 0.15 g of the Catalyst Component (A) were introduced to the autoclave at 60° C. under a nitrogen atmosphere.

The 1st-step polymerization was initiated by introducing propylene and ethylene to the autoclave with a feed rate of

TABLE 3

| | Solid Catalyst (Component (A) Used) | Optional Ingredient | Catalyst Activity (g Polymer/g Component (A)) | Bulk Density (g/cc) | MFR (g/10 mm) | Cold Xylene Extract | | | Cold Xylene Insoluble | | | Flexural Modulus (Kg/cm$^2$) | Izod Impact Strength (23° C.) (Kg − cm/cm$^2$) |
|---|---|---|---|---|---|---|---|---|---|---|---|---|---|
| | | | | | | Content (% by weight) | Ethylene Content | $r_E r_P$ | Melting Point (°C.) | [mm] triad | | | |
| Example 11 | 5 g (2.85 mg) | Toso-Akzo Triisobutyl-aluminum 0.15 g | 17,800 | 0.37 | 24.2 | 38.5 | 63.2 | 1.56 | 149 | 0.93 | | 9,100 | 10.1 |
| Example 12 | 2 g (2.98 mg) | Toso-Akzo Triisobutyl-aluminum 0.15 g | 36,600 | 0.34 | 19.9 | 17.9 | 64.0 | 1.63 | 144 | 0.92 | | 9,400 | 7.3 |
| Example 13 | 2 g (2.38 mg) | Toso-Akzo Triisobutyl-aluminum 0.15 g | 22,700 | 0.35 | 7.5 | 29.0 | 65.0 | 1.05 | 152 | 0.95 | | 9,600 | 10.6 |

<Reference Example 1>

(Production of Rubbery Copolymer in the 1st Step and Propylene Homopolymer in the 2nd Step by the Use of Titanium Trichloride Solid Catalyst Component)

(1) Preparation of Solid Catalyst Component (A)

In a 500-ml three-necked glass flask (equipped with a thermometer, a dropping funnel and a stirrer) purged with nitrogen, 144 ml of purified heptane and 58 ml of titanium tetrachloride were placed. 120 ml of heptane and 66 ml of diethylaluminum chloride were charged in the dropping funnel.

The flask was cooled to a temperature of −10° C., and the diethylaluminum chloride charged in the dropping funnel was added dropwise to the content of the flask over a period of 3 hours with stirring at 120 rpm. Reaction was carried out at a temperature of −10° C. for one hour. The temperature of the inside of the system was then slowly raised to 65° C. over a period of one hour, and the reaction was continued at the temperature for an additional one hour.

108 g/hr and 72 g/hr, respectively, after the temperature of the autoclave was raised to 65° C.

After 20 minutes, the introduction of propylene and ethylene was suspended, and the polymerization was continued at 65° C. for an additional 20 minutes. The gas in the gas phase was purged to a pressure of 1 kg/cm$^2$G.

Thereafter, the 2nd-step polymerization was carried out by feeding propylene for 102 minutes with a feed rate of 200 g/hr. The polymerization was continued for additional 120 minutes.

Butanol was added to the slurry thus obtained to decompose the catalyst, and 167 g of the block copolymer (1) was finally obtained by stripping. The MFR of this copolymer was 6.8. The cold xylene extract of the copolymer had an ethylene content of 38% by weight. The melting point of the xylene-insoluble part was 159.9° C. The copolymer had a flexural modulus of 9,400 kg/cm$^2$, and an Izod impact strength at 23° C. of 7.6 kg-cm/cm$^2$.

<Reference Example 2>

(Production of Propylene Homopolymer in the 1st Step and Rubbery Copolymer in the 2nd Step by the Use of Titanium Trichloride Solid Catalyst Component)

A 10-liter autoclave equipped with a stirring means was thoroughly purged with propylene, and 4 liters of purified n-heptane was then introduced thereto. 1 g of diethylaluminum chloride and 0.07 g of the solid Catalyst Component (A) used in Reference Example 1 were introduced to the autoclave at 60° C. under a propylene atmosphere.

The 1st-step polymerization was initiated by introducing propylene to the autoclave with a feed rate of 200 g/hr while keeping the concentration of hydrogen in the gas phase to 5 vol. %, after the temperature of the autoclave was raised to 65° C.

After 102 minutes, the introduction of propylene was suspended, and the polymerization was continued at 65° C. for an additional 60 minutes. The propylene gas in the gas phase was then purged to a pressure of 1 kg/cm²G.

Thereafter, the 2nd-step polymerization was carried out by feeding propylene and ethylene for 20 minutes with a feed rate of 108 g/hr and 72 g/hr, respectively. The polymerization was continued for an additional 30 minutes.

Butanol was added to the slurry thus obtained to decompose the catalyst, and 210 g of the block copolymer (2) was finally obtained by stripping. The MFR of this copolymer was 5.1. The cold xylene extract of the copolymer had an ethylene content of 37% by weight. The melting point of the xylene-insoluble part was 161.9° C. The copolymer had a flexural modulus of 10,900 kg/cm², and an Izod impact strength at 23° C. of 7.7 kg-cm/cm².

<Reference Example 3>

(Production of Rubbery Copolymer in the 1st Step and Propylene Homopolymer in the 2nd Step by the Use of MgCl₂-Ti-Containing Solid Component)

(1) Preparation of Solid Catalyst Component (B)

To a flask thoroughly purged with nitrogen, 200 ml of dehydrated and deoxygenated n-heptane was introduced. Subsequently, 0.4 mol of $MgCl_2$ and 0.8 mol of Ti(O-nC₄H₉)₄ were introduced to the flask, and reaction was carried out at 95° C. for 2 hours. After the reaction was completed, the temperature of the reaction system was lowered to 40° C. 48 ml of methylhydrogenepolysiloxane (20 centistokes) was then introduced to the flask, and allowed to react for 3 hours. The solid component produced was washed with n-heptane.

Subsequently, to a flask thoroughly purged with nitrogen was introduced 50 ml of purified n-heptane. To this was introduced the above-synthesized solid component (0.24 mol with respect to Mg atom). 0.4 mol of $SiCl_4$ was mixed with 25 ml of n-heptane, and the mixture was introduced to the flask at 30° C. over a period of 60 minutes. Reaction was carried out at 90° C. for 3 hours.

0,016 mol of phthalic acid chloride was mixed with 25 ml of n-heptane, and the mixture was further introduced to the flask at 90° C. over a period of 30 minutes. Reaction was carried out at 90° C. for one hour.

After the reaction, the product formed was washed with n-heptane. To this was then introduced 0.24 mmol of $SiCl_4$, and reaction was carried out at 100° C. for 3 hours. After the reaction, the product was thoroughly washed with n-heptane. 50 ml of thoroughly purified n-heptane was introduced to a flask thoroughly purged with nitrogen, and 5 g of the above-obtained solid component was then introduced thereto. 0.81 ml of $(CH_3)_3CSi(CH_3)(OCH_3)_2$ was further introduced to the flask, and brought into contact with the content of the flask at 30° C. for 2 hours. Thereafter, the product was thoroughly washed with n-heptane to obtain the solid Catalyst Component (B).

(2) Production of Block Copolymer 237 g of the block copolymer (3) was obtained in the same manner as in Reference Example 1 except that 1.0 g of trialkylaluminum and 0.06 g of the above-obtained solid Catalyst Component (B) were used as the cocatalyst and the catalyst, respectively. The MFR of the copolymer was 7.5. The cold xylene extract of the copolymer had an ethylene content of 35% by weight. The melting point of the xylene-insoluble part was 162.4° C. The copolymer had a flexural modulus of 10,200 kg/cm², and an izod impact strength at 23° C. of 9.8 kg-cm/cm².

<Reference Example 4>

(Production of Propylene Homopolymer in the 1st Step and Rubbery Copolymer in the 2nd Step by the Use of MgCl₂-Ti-Containing Solid Component)

251 g of the block copolymer (4) was obtained in the same manner as in Reference Example 2 except that 1.0 g of trialkylaluminum and 0.03 g of the above-obtained solid Catalyst Component (B) were used as the cocatalyst and the catalyst, respectively. The MFR of the copolymer was 5.4. The cold xylene extract of the copolymer had an ethylene content of 36% by weight. The melting point of the xylene-insoluble part was 165.6° C. The copolymer had a flexural modulus of 12,000 kg/cm², and an izod impact strength at 23° C. of 9.5 kg-cm/cm².

The results of Reference Examples 1 to 4 demonstrate that when the 1st and 2nd polymerization steps for use in the present invention are adopted in the production of a propylene block copolymer, using the known titanium trichloride solid catalyst component or MgCl₂-Ti-containing solid component, the product is obtained in a low yield per catalyst. Moreover, the product is poor in the balance between rigidity and Izod impact strength.

What is claimed is:

1. A process for producing a propylene block copolymer comprising carrying out substantially in the gas phase the following polymerization step (1) in the presence of a catalyst comprising the following Components (A) and (B), and then carrying out the following polymerization step (2) in the presence of the catalyst used in and in the presence of the polymer prepared in the polymerization step (1) to form a block copolymer having a weight ratio of a polymer produced in the polymerization step (1) to the resulting polymer produced in the polymerization step (2) in the range from 5/95 to 70/30:

Component (A) which is a compound of a transition metal in the IVB–VIB groups of the Periodic Table which has a n-conjugated five-membered ring ligand;

Component (B) which is at least one compound selected from the compound group consisting of:
ingredient (i) which is an alkylalumoxane;
ingredient (ii) which is a reaction product of the compound represented by the formula

wherein R⁴ represents a hydrocarbon group having 1–10 carbon atoms, with an organoaluminum compound;
ingredient (iii) which is a Lewis acid; and ingredient (iv) which is an ionic compound, Polymerization step (1) which is a step for polymerizing propylene with at least one comonomer selected from the group consisting of ethylene and an α-olefin having 4–20 carbon atoms so that the polymerization ratio in a molar ratio of propylene to the comonomer will be in the range from 0/100 to 80/20; and Polymerization step (2) which is a step for producing a crystalline propylene homopolymer or a propylene copolymer of propylene with at least one comonomer selected from the group consisting of ethylene and an α-olefin having 4–20 carbon atoms, the copolymer having a comonomer content no higher than 10% by weight based on the monomers used in the polymerization step (2).

2. The process for producing a propylene block copolymer according to claim 1, wherein the Component (A) is represented by the formula [I] or [II]:

$$Q(C_5H_{4-a}R^1_a)(C_5H_{4-b}R^2_b)MeXY \qquad [I]$$

$$S(C_5H_{4-c}R^3_c)ZMeXY \qquad [II]$$

wherein Q represents a bonding group which crosslinks the two conjugated five-membered ring ligands, S represents a bonding group which crosslinks the conjugated five-membered ring ligand with the group Z; Me represents a transition metal in the IVB–VIB groups of the Periodic Table; X and Y, respectively, represent independently a hydrogen atom, a halogen atom, a hydrocarbon group having 1–20 carbon atoms, an alkoxy group and alkylamido group having 1–20 carbon atoms, a phosphorus-containing hydrocarbon group having 1–20 carbon atoms, or a silicon-containing hydrocarbon group having 1–20 carbon atoms; Z represents oxygen, sulfur, an alkoxy group having 1–20 carbon atoms, a thioalkoxy group having 1–20 carbon atoms, a silicon-containing hydrocarbon group having 1–40 carbon atoms, a nitrogen-containing hydrocarbon group having 1–40 carbon atoms, or a phosphorus-containing hydrocarbon group having 1–40 carbon atoms; $R^1$, $R^2$ and $R^3$, respectively, represent independently a hydrocarbon group having 1–20 carbon atoms, a halogen atom, an alkoxy group, a silicon-containing hydrocarbon group, a phosphorus-containing hydrocarbon group, a nitrogen-containing hydrocarbon group or a boron-containing hydrocarbon group, two adjacent $R^1$, two adjacent $R^2$, or two adjacent $R^3$ may or may not be bonded to each other at their ω-terminals to form a ring, respectively; a, b and c denote an integer which satisfies $0 \leq a \leq 4$, $0 \leq b \leq 4$, and $0 \leq c \leq 4$, respectively.

3. The process for producing a propylene block copolymer according to claim 2, wherein the transition metal compound represented by the formula [I] or [II] is a compound which gives an isotactic polypropylene having an [mm] of the xylene insolubles in the propylene block copolymer of no smaller than 0.80 on carrying out the both processes (1) and (2) in claim 1 with use of the compound.

4. The process for producing a propylene block copolymer according to claim 3, wherein the transition metal compound represented by the formula [I] or [II] has the following substituents:

Q, S: —CH₂—, —C(CH₃)₂—, —C(C₆H₅)₂—, —CH₂CH₂—, —CH(C₆H₅)—CH(C₆H₅)—, —Si(CH₃)₂—, —Si(CH₃)(C₆H₅)—, or —Si(C₆H₅)₂—;

R¹, R², R³: —CH₃, —C₂H₅, -isoPr, -t-Bu, -iso-Bu, -n-Bu, —Si(CH₃)₃, —CH═CH—CH═CH—, —CH═C(CH₃)—CH═CH—, —CH═C(C₆H₅)— CH═CH—, —CH₂—CH₂—CH₂—CH₂—, —CH₂— CH₂—CH₂—CH₂—CH₂—, —C(CH₃)₂—CH═CH— CH═CH—, —C(CH₃)₂—CH₂—CH₂—CH₂— CH₂—, —C(CH₃)₂—CH₂—CH₂'CH₂—, or —Si(CH₃)₂—CH₂—CH₂—CH₂—;

a: 0, 1, 2, 3 or 4;

b: 0, 1, 2, 3 or 4;

c: 0, 1, 2, 3 or 4;

Me: Ti, Zr or Hf;

X: —H, —Cl, —Br, —F, —CH₃, —CH₂(C₆H₅), —(C₆H₅), —N(CH₃)₂, —N(C₂H₅)₂, or —OSO₂CF₃; and Z: >N-t-Bu, >N—(C₆H₅), >N—C₆H₁₁, >N—C₈H₁₅, or >N—C₁₂H₂₃.

5. The process for producing a propylene block copolymer according to claim 2, wherein the transition metal compound is represented by the formula [I].

6. The process for producing a propylene block copolymer according to claim 1, wherein the alkylalumoxane of the ingredient (i) has 1 to 6 carbon atoms in the alkyl.

7. The process for producing a propylene block copolymer according to claim 1, wherein the organoaluminum compound which gives the reaction product of the ingredient (ii) is represented by the formula:

$$R_{3-q}^5 AlX_q \quad R_{3-q}^5 Al\text{—}[OSi\text{—}(R^6)_3]_q; \text{ or}$$

$$(R^5)_2\text{—}Al\text{—}O\text{—}Al\text{—}(R^5)_2$$

wherein $R^5$ represents a hydrocarbon group having 1–10, preferably 1–6 carbon atoms, X represents a hydrogen or a halogen atom, $R^6$ represents a hydrogen atom, a halogen atom, or a hydrocarbon group having 1–10, preferably 1–6 carbon atoms, q denotes $0 \leq q < 3$.

8. The process for producing a propylene block copolymer according to claim 1, wherein the Lewis acid of the ingredient (iii) is an organoboron compound or a metal halide.

9. The process for producing a propylene block copolymer according to claim 1, wherein the ionic compound of the ingredient (iv) is a compound which can react with the Component (A) to convert it into a cation.

10. The process for producing a propylene block copolymer according to claim 1, wherein the catalyst comprising the Components (A) and (B) is carried on a finely divided particulate support as the Component (C).

11. The process for producing a propylene block copolymer according to claim 10, wherein the particulate support of the Component (C) has a particle diameter in the range of 1–3,000 μm.

12. The process for producing a propylene block copolymer according to claim 10, wherein the finely divided particulate support of the Component (C) has a total volume of 0.006–10 μm pores in the range of 0.1 cc/g or more.

13. The process for producing a propylene block copolymer according to claim 10, wherein the Components (A) and (B) are solubilized in an inert solvent and the Component (C) is impregnated with the solution, so that the Components (A) and (B) are carried on the Component (C), the residual amount of the inert solvent in the impregnated state being in the range of 0–70% by weight to the Component (C) after impregnation.

14. The process for producing a propylene block copolymer according to claim 13, wherein the residual amount of the inert solvent is at least 5% by weight.

15. The process for producing a propylene block copolymer according to claim 1, wherein the catalyst having the Components (A) and (B) carried on the Component (C) is subjected to preliminary polymerization in that the catalyst is brought into contact with an olefin selected from the group consisting of ethylene, propylene, butene-1, 3-methyl-butene-1 and a mixture thereof, to polymerize the olefin into a polymer in an amount of 0.01–500 g per 1 g of the supported catalyst comprising the Components (A), (B) and (C).

16. The process for producing a propylene block copolymer according to claim 1, wherein an organoaluminum compound is further employed in combination with the catalyst.

* * * * *